US011428045B2

(12) United States Patent
Marocco

(10) Patent No.: US 11,428,045 B2
(45) Date of Patent: Aug. 30, 2022

(54) BLIND CONTROL HAVING A NARROW PROFILE DRIVE WITH GEARS BETWEEN THE BLIND ROLL AND WINDOW

(71) Applicant: MAXXMAR INC., Toronto (CA)

(72) Inventor: Norbert Marocco, Toronto (CA)

(73) Assignee: MAXXMAR INC., Toronto (CA)

( * ) Notice: Subject to any disclaimer, the term of this patent is extended or adjusted under 35 U.S.C. 154(b) by 0 days.

(21) Appl. No.: 16/283,082

(22) Filed: Feb. 22, 2019

(65) Prior Publication Data

US 2019/0264502 A1 Aug. 29, 2019

Related U.S. Application Data

(60) Provisional application No. 62/634,541, filed on Feb. 23, 2018.

(51) Int. Cl.
*E06B 9/74* (2006.01)
*E06B 9/78* (2006.01)
(Continued)

(52) U.S. Cl.
CPC .............. *E06B 9/74* (2013.01); *E06B 9/42* (2013.01); *E06B 9/76* (2013.01); *E06B 9/78* (2013.01); *E06B 9/80* (2013.01); *F16H 37/041* (2013.01); *F16H 57/031* (2013.01); *F16H 57/039* (2013.01)

(58) Field of Classification Search
CPC ..... E06B 9/74; E06B 9/76; E06B 9/78; E06B 9/80; E06B 9/42; F16H 37/041; F16H 57/031; F16H 57/039
See application file for complete search history.

(56) References Cited

U.S. PATENT DOCUMENTS 4,522,245 A 6/1985 Anderson
4,875,516 A * 10/1989 Marocco ................. E06B 9/307
160/178.1 R
(Continued)

FOREIGN PATENT DOCUMENTS

CA 2353114 C 5/2002
CN 2642178 Y * 9/2004 ............... E06B 9/76
(Continued)

*Primary Examiner* — Thomas C Diaz
(74) *Attorney, Agent, or Firm* — Eugene J. A. Gierczak; Gardiner Roberts LLP

(57) ABSTRACT

A blind control for a window covering having a narrow profile; and particularly relates to a control module for a window shade where the location of the drive mechanism is selected to minimize the gap between the end of the window shade and inside edge of a window opening; locating the drive mechanism in a shell disposed in a housing to rigidify a reduced thickness of the drive so as to minimize the gap; and use a single rod depending from the control module to activate the drive mechanism in a safe and secure manner. The invention also includes a housing with an end wall adjacent one end of the shade; a clutch projecting from said end wall and rotatable about a clutch axis, a drive gear engageable at one end of the clutch for rotatably driving said clutch and shade, said drive gear disposed in said housing adjacent said end wall; and a wand for driving said drive gear.
The invention provides for a wand to raise and lower the window shade.

21 Claims, 21 Drawing Sheets

(51) Int. Cl.
*E06B 9/80* (2006.01)
*F16H 57/039* (2012.01)
*E06B 9/76* (2006.01)
*F16H 37/04* (2006.01)
*F16H 57/031* (2012.01)
*E06B 9/42* (2006.01)

(56) References Cited

U.S. PATENT DOCUMENTS

| | | |
|---|---|---|
| 6,685,592 B2 | 2/2004 | Fraczek et al. |
| 6,973,952 B2 | 12/2005 | Nien |
| 7,089,988 B2 | 8/2006 | Coleman |
| 7,204,292 B2 * | 4/2007 | Nien .................. E06B 9/74 |
| | | 160/168.1 R |
| 9,187,951 B2 | 11/2015 | Yu et al. |
| 9,376,859 B1 * | 6/2016 | DeWard .................. E06B 9/307 |
| 9,528,318 B2 | 12/2016 | Huang et al. |
| 9,567,802 B2 | 2/2017 | Buccola, Jr. et al. |
| 2016/0017964 A1 | 1/2016 | Yu et al. |
| 2016/0138334 A1 * | 5/2016 | Dean .................. E06B 9/76 |
| | | 160/309 |

FOREIGN PATENT DOCUMENTS

| | | | | |
|---|---|---|---|---|
| DE | 202014102949 U1 * | 9/2014 | ............... | E06B 9/76 |
| DE | 202016107325 U1 * | 1/2017 | .............. | E04F 10/06 |
| GB | 2486555 A * | 6/2012 | ............... | E06B 9/78 |

\* cited by examiner

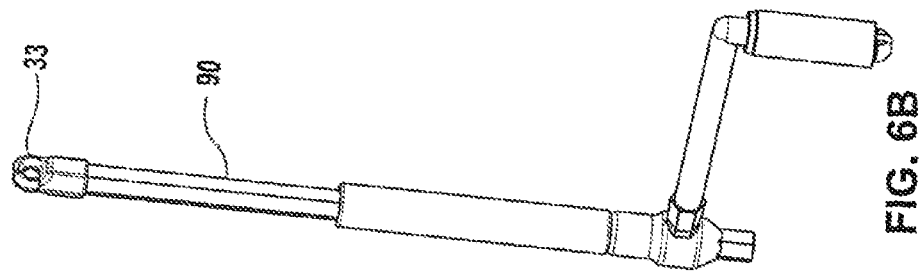
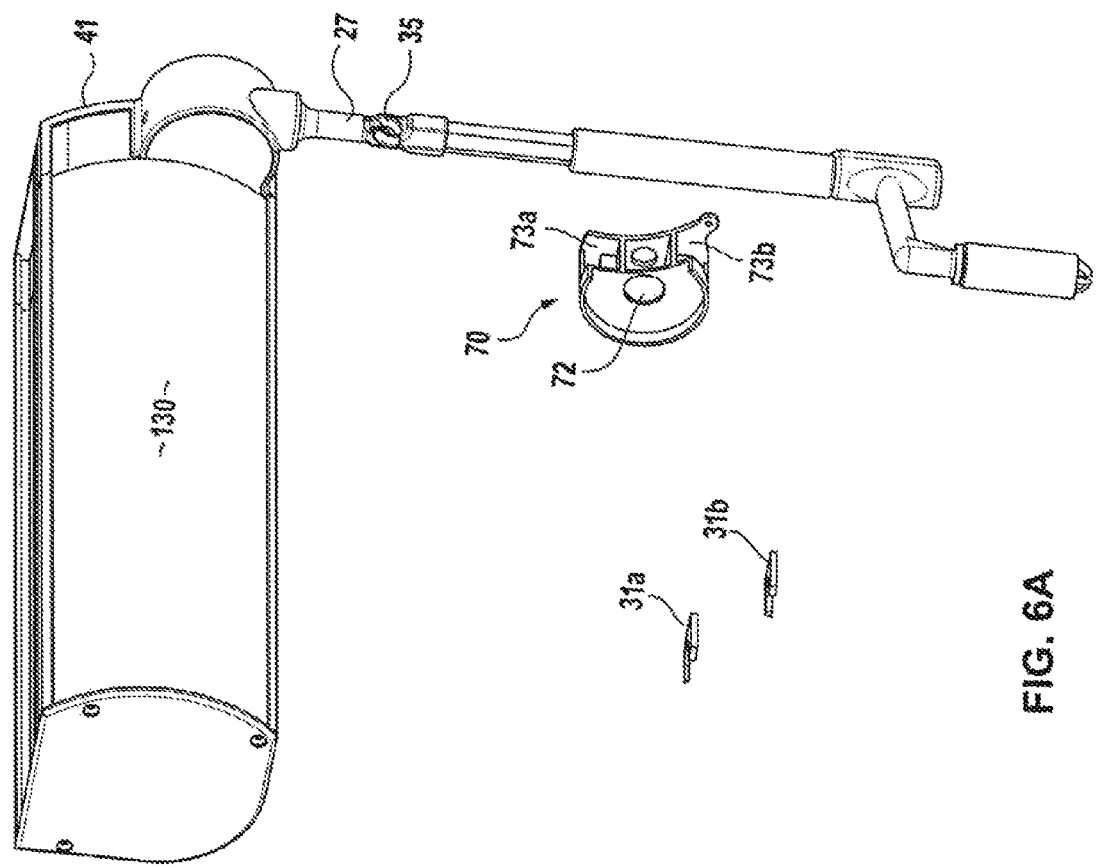
FIG. 6B
FIG. 6A

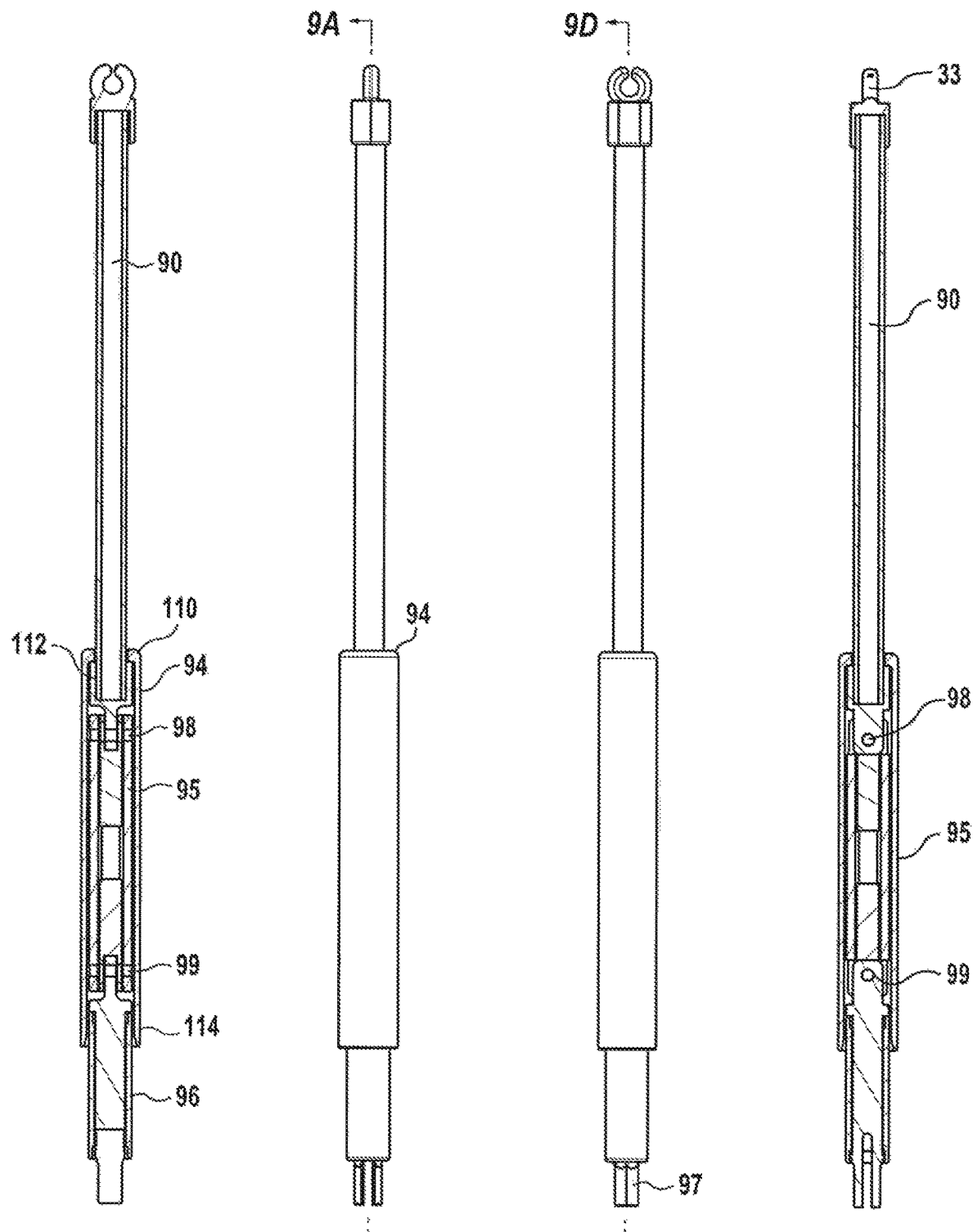

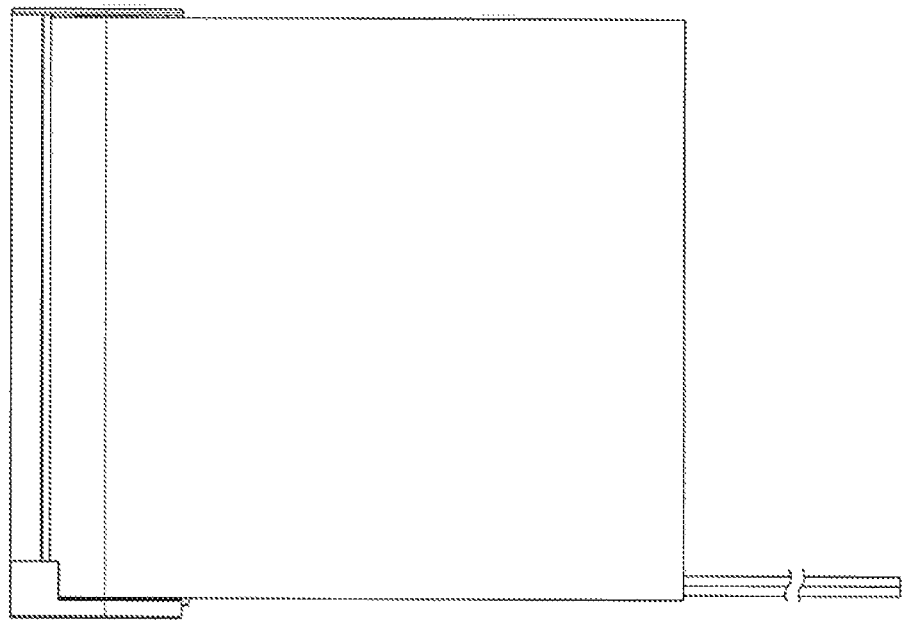
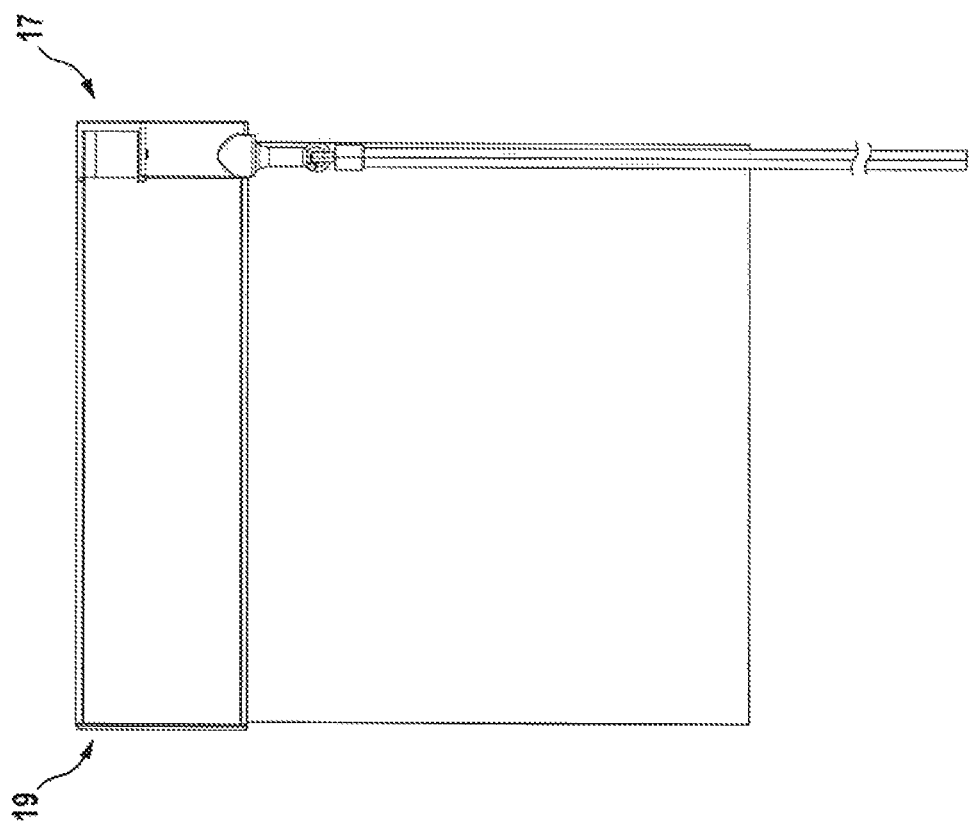
FIG. 11A
FIG. 11B

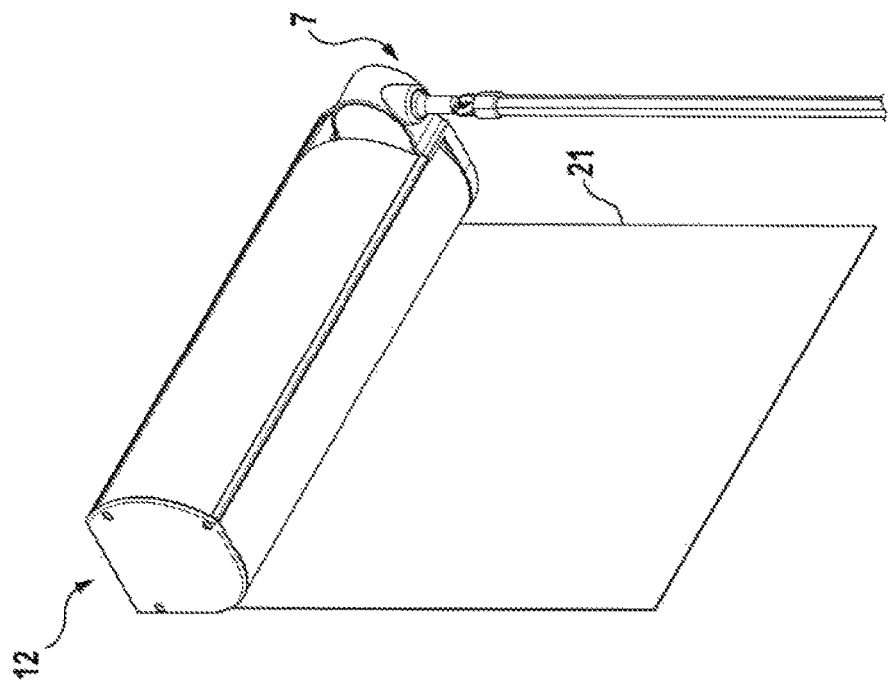
FIG. 11E
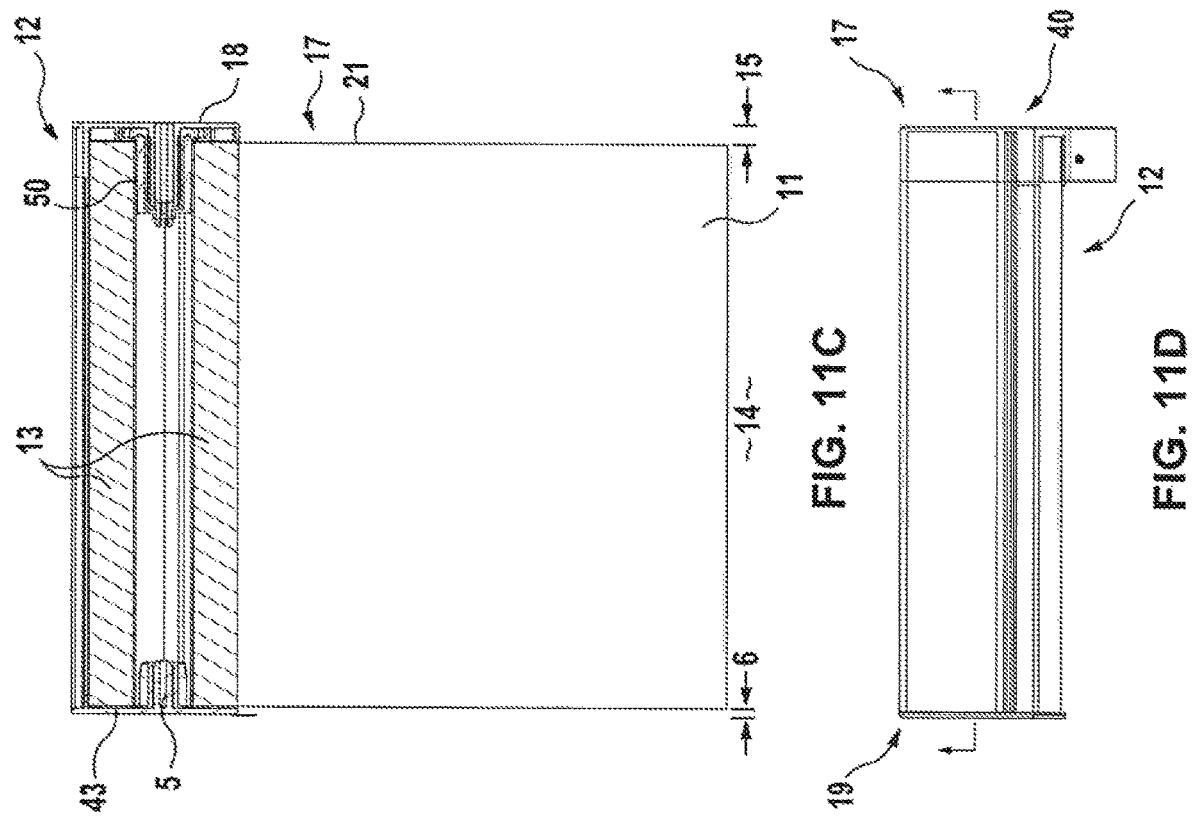
FIG. 11C
FIG. 11D

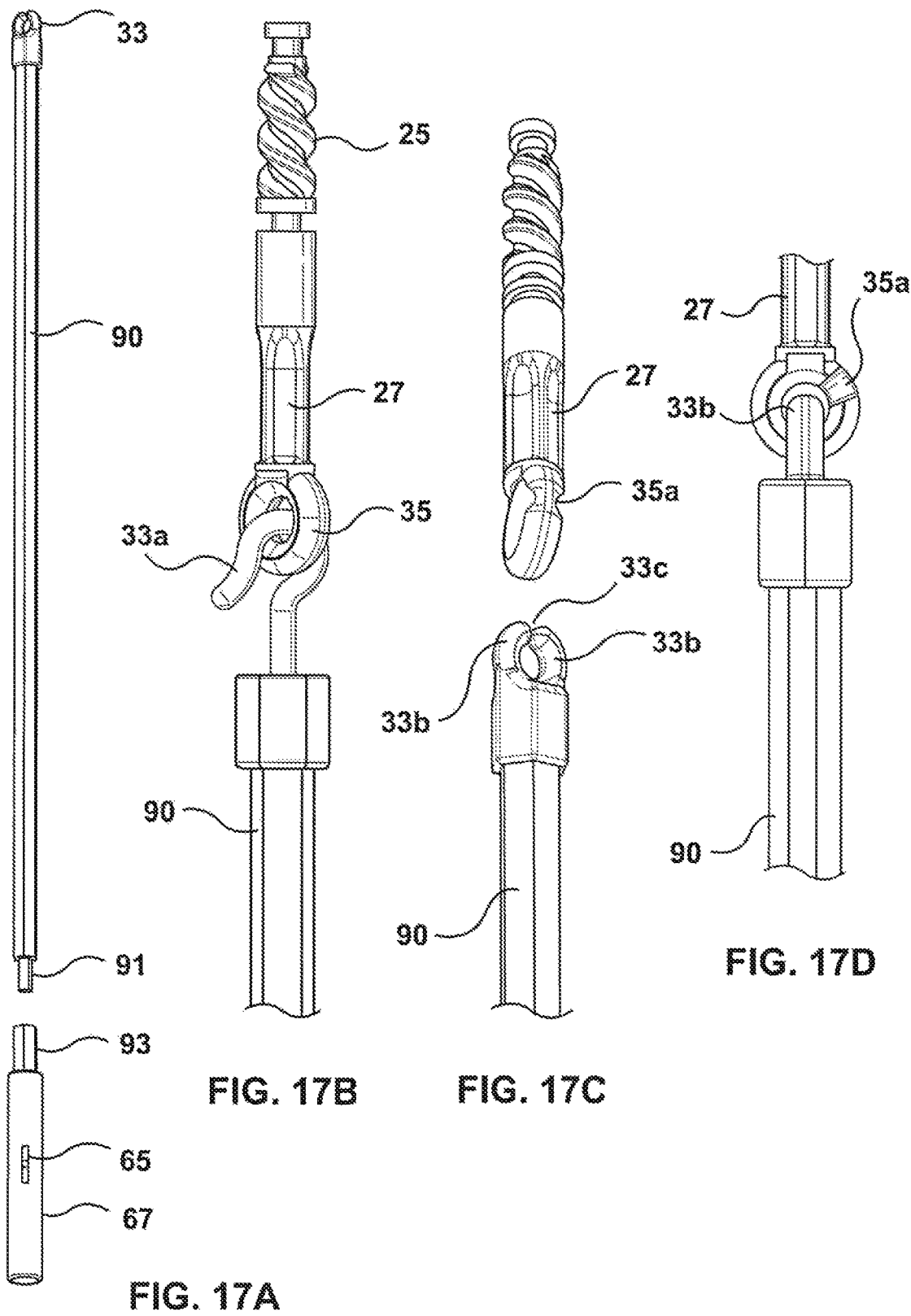

BLIND CONTROL HAVING A NARROW PROFILE DRIVE WITH GEARS BETWEEN THE BLIND ROLL AND WINDOW

FIELD OF THE INVENTION

The invention relates to a blind control for a window covering having a narrow profile; and particularly relates to a control module for a window shade where the location of the drive mechanism is selected to minimize the gap between the end of the window shade and window opening; locating the drive mechanism in a shell disposed in a housing to rigidify a reduced thickness of the drive so as to minimize the gap between the end of the window shade and the inside edge of the window opening; and use a single rod depending from the control module to activate the drive mechanism in a safe and secure manner.

The invention also includes a housing with a control end wall adjacent one end of the shade roll; a clutch projecting from said control end wall and rotatable about a clutch axis, a drive gear engageable at one end of the clutch for rotatably driving said clutch and shade roll, said drive gear disposed in said housing adjacent said control end wall; and a wand for driving said drive gear.

BACKGROUND OF THE INVENTION

Blinds for building openings, eg windows, doors and the like, may be operated either simply down and up, in the case of eg. roller blinds, or in the case of eg. vertical shade panels, the vertical shade panels may be rotated open or closed.

The control elements for these blind operations are usually in the form of an endless cord or chain. The control element simply hangs down along one side of the building opening, in an endless loop.

Other forms of blinds and window coverings may also be operated by means of an endless control element hanging in a loop.

Generally speaking clutch mechanisms have been used in the window covering industry to inhibit the unwanted unrolling of window blinds. These clutch mechanisms have generally been used with sprocket wheels located at the end of window blinds so that the gap between the end of the blind and window frame is controlled to minimize the amount of unwanted light infused into a room. Generally speaking the use of spur gears and worm or bevel gears have not been widely used as they tend to increase the gap between the end of the window shade and window frame. When they have been used, attempts to reduce the thickness of such drives tended to produce a drive that flexed and wandered, and they tended to "bind" when used.

Furthermore there is great interest to provide a child safe environment so that it is desirable to use a single rod to activate the gear drive in a window shade as opposed to using an endless loop which can endanger a child.

For example US 2016/0017964 relates to a control module of a window shade includes a drive axle affixed with a sleeve, an arrester assembled around the sleeve, a cord drum connected with an operating cord, a clutch operable to couple and decouple the cord drum with respect to the drive axle, and a release unit including a stick that is operatively connected with the arrester. The arrester blocks rotation of the drive axle in a locking state, and has an unlocking state allowing rotation of the drive axle. The operating cord is pulled to drive the cord drum in rotation and turn the clutch to a coupling state, such that the rotation of the cord drum is transmitted through the clutch to drive the drive axle in rotation for raising the shading structure. Moreover, the stick is operable to switch the arrester from to the unlocking state for lowering the shading structure by gravity action.

U.S. Pat. No. 9,187,951 shows a window shade comprises a head rail, a shading structure, a bottom part, suspension cords connected with cord winding units, and a control module. The control module includes a drive axle assembled with the cord winding units, a sleeve affixed with the drive axle, an arrester assembled around the drive axle, and a release unit. The arrester has a locking state in which the arrester blocks a rotational displacement of the sleeve and the drive axle to keep the bottom part at a desired position, and an unlocking state in which rotation of the sleeve and the drive axle is allowed to lower the bottom part by gravity action. The release unit includes an actuator that is operatively connected with the arrester and has an elongated shape. The actuator can rotate about its lengthwise axis to turn the arrester from the locking to unlocking state.

U.S. Pat. No. 6,685,592 relates to a bi-directional clutch for operating a window dressing such as a roller shade includes a protective guard for securing the window dressing to a stationary structure, a gear box for transmitting rotation to an output member in response to the operation of an elongated operating member such as a cord, and an anti-rotational member that prevents the undesirable operation of the output member. The output member is coupled to the window dressing. The gear box includes a gear pulley coupled to the elongated operating member, a planetary gear and a stationary gear. The gear box is arranged and constructed to transmit motion to the output member in response to the activation of the elongated operating member, at a predetermined mechanical advantage.

U.S. Pat. No. 4,522,245 shows a housing for a venetian blind tilter mechanism. The housing comprises a single piece integrally molded body having apertures in the walls of the body serving as bearing journals for a tilter shaft having a worm gear thereon and serving as bearing journals for a worm wheel in meshing engagement with the worm gear.

U.S. Pat. No. 9,528,318 relates to a window shade that includes a head rail, a bottom part, a shading structure arranged vertically between the head rail and the bottom rail, a winding unit having a suspension member connected with the bottom part, and the actuating system arranged in the head rail. The winding unit is rotationally coupled with the transmission axle, wherein the transmission axle rotates in the second direction to cause unwinding of the suspension member from the winding unit for lowering the bottom part, and in the first direction to wind the suspension member into the winding unit for raising the bottom part.

U.S. Pat. No. 9,567,802 discusses a covering for an architectural opening having nested rollers.

U.S. Pat. No. 9,376,859 teaches a tilter assembly is operatively connected to the slats for tilting the slats and comprises a wand shaft operatively connected to a worm gear. A drive gear operatively connected to a tilt shaft, and at least one idler gear connects the worm gear to the drive gear. The axis of rotation of the wand shaft is disposed at an angle relative to the plane to space a wand controller from the front plane. The wand shaft may include a wand connector that is releasably connected to the tilter assembly.

U.S. Pat. No. 7,089,988 shows a window blind opening and closing device.

U.S. Pat. No. 7,204,292 illustrates A window blind is constructed to include a headrail, a blind body suspended below the headrail, a linking mechanism mounted inside the headrail and having a power input device fastened pivotally with the headrail and an actuator rotatable with the power input device and connectable to the blind body, and a driving control mechanism. The driving control mechanism includes a suspension rod suspended from the headrail and a controller detachably coupled to the suspension rod for enabling the suspension rod to be driven by the controller to rotate the power input device and to further drive the actuator to move the blind body, causing the blind body to change the window shading status.

Also U.S. Pat. No. 6,973,952 relates to an anti-reverse transmission for use in a window blind includes a fixed axle, a rotatable input shaft, an output shaft sleeved onto the fixed axle, a transmission shaft sleeved onto the output shaft and coupled to a linking rod of a window blind, the transmission shaft having a protrusion inserted into an opening in the output shaft, and a spiral spring fitted on the fixed axle within the output shaft. The spiral spring has two end tips suspended in the opening such that the spiral spring is radially expanded to disengage the output shaft from the fixed axle for rotation with the transmission shaft and the input shaft upon rotation of the input shaft, and the spiral spring is radially compressed to stop the output shaft from rotation when the transmission shaft receives a biasing force from the gravity weight of a blind body of the window blind.

Finally Canadian Patent 2353114 shows a method and apparatus for operating a blind having a chain wheel and wand.

These and other prior art devices and blind controls attempt to block out the light coming from outside the window particularly when a person desires to sleep.

It is an object of this invention to provide an improved blind control for a window covering.

It is another object of this invention to locate the drive mechanism to minimize the gap between the end of the window shade and window frame.

Another object of this invention relates to locating the drive mechanism in a shell or cage disposed in a housing to rigidify a reduced thickness of the drive so as to minimize the gap.

Yet another object of this invention relates to the use a single rod depending from the control module to activate the drive mechanism in a safe and secure manner.

It is another object of this invention to provide a narrow profile control module for a window shade to minimize light from outside the window infiltrating the room.

SUMMARY OF INVENTION

It is an aspect of this invention to provide a control module for a window shade for a window opening comprising; a driven gear disposed between the window shade and an edge of the window opening so as to define a gap there between; a drive gear located outside the gap and engageable with said window shade for rotatably driving the driven gear so as to raise and lower said window shade relative the window opening; and a rod for driving said drive means.

In one embodiment the control module includes a housing having an end wall adjacent the inside edge of the window opening, a clutch disposed within said housing and engageable with the window shade, where the driven gear is engageable with the clutch and disposed between the window shade and the end adjacent the edge of the window opening.

In another embodiment the housing includes a first housing portion for receiving the driven gear and a second housing portion communicating with the first housing portion, the second housing portion receiving the drive gear. In another embodiment the housing includes a shell plate for covering the driven gear in said first chamber and for covering the drive gear in the second chamber and constrain the drive gear and driven gear against binding.

In another embodiment the second housing portion is axially spaced from the clutch axis.

In a further embodiment the driven gear comprises a spur gear disposed at the one end of the clutch between the end wall and the one end of the shade so as to define a narrow gap between the one end of said shade and the inside edge of said window opening. The thickness of said spur gear along said clutch axis in one example is between 5 to 8 millimeters.

Other embodiments include at least one intermediate gear between the spur gear and the drive gear. Also the drive gear can be either a worm wheel or bevel gear.

In yet another embodiment the clutch includes selectively engageable braking structure for preventing the shade from unrolling when the driven gear is idle.

It is another aspect of the invention to provide a narrow profile control module for a window shade roll comprising; a housing disposed at one end of said window shade roll, said housing having a control end wall and a first cavity and a second cavity, said first cavity communicating with said second cavity; a spur gear disposed in said first cavity between said control end wall and one end of said window shade roll, and defining a gap between said one end of the window shade and window opening; a clutch projecting from said spur gear into said window shade roll, said spur gear rotatably engageable with said clutch about a clutch axis for raising and lowering said window shade relative the window opening; a drive gear disposed in the second cavity away from the clutch axis so as to not interfere with the gap; the drive gear engageable with the spur gear for rotatably driving the clutch about the clutch axis for raising and lowering the window shade; a rod connected to the drive gear for rotatably driving the spur gear.

In one embodiment the driven gear between said end wall and the one end of the blind is between 5 and 8 millimeters.

In another embodiment of the invention the drive gear is a worm gear engageable with the spur gear. The invention also includes at least one intermediate gear between the spur gear and the drive gear. The drive gear can also be either a worm gear or bevel gear.

In a further embodiment the housing includes a cover plate to cover the first cavity and the second cavity and the one end of the shade contacts the cover plate in the first cavity to define the gap between the cover pate covering the first cavity and the end wall.

Another embodiment includes a wand having one end connected to the drive gear and a handle at another end for manually rotating the wand and drive gear.

Furthermore in yet another embodiment the wand includes a shaft defining spiral grooves and a hand portion coaxially receiving the shaft for reciprocal movement of the hand portion relative the shaft to rotate the wand in a selected first or second direction. The hand portion includes a slideable selector for selecting the direction of rotation of said drive gear means.

It is a further aspect of the invention to provide a control module for a window shade for a window opening comprising; a housing disposed at one end of said window shade and said window opening to define a gap there between; a first and second cavity presented by said housing, said second cavity communicating with said first cavity and radially disposed beyond said first cavity; a driven gear disposed within said first cavity; drive structure located within said second cavity and engageable with said driven gear for rotatably driving the driven gear so as to raise and lower said window shade relative the opening; and a rod for driving said drive means.

In one embodiment the housing has an end wall adjacent an inside edge of the window opening, a clutch projecting from said housing and engageable with said window shade, said driven gear engageable with or connected to said clutch and disposed between said window shade and said end wall adjacent said edge of the window opening. Furthermore the drive structure comprises a drive gear disposed in said second cavity adjacent said end wall and engageable with said driven gear for rotatably driving said clutch and shade about a clutch axis for raising and lowering said shade relative said window opening, said drive structure and driven gear disposed in a region within said gap.

In yet another embodiment the housing includes a first housing portion defining said first cavity for receiving said driven gear and a second housing portion defining said second cavity portion for communicating with said first housing portion, said second housing portion receiving said drive gear structure. A further embodiment provides that said first and second housing portion is radially spaced from said clutch axis. A shell plate for covering said driven gear in said first chamber and for covering said drive gear structure in said second chamber and constrain said drive gear structure and driven gear against binding can be provided. In yet another embodiment said first and second housing portion is coaxially spaced from said clutch axis.

In another embodiment the driven gear comprises a spur gear disposed at said one end of said clutch between said end wall and said one end of said shade and disposed in said gap between said one end of said shade and said edge of said window; and the drive gear structure is a worm gear. Moreover in yet another embodiment the second cavity has a first and second opening communicating with said first cavity whereby said worm gear is selectively disposed adjacent said first or second opening for engaging with said spur gear in said first cavity so as to present a control module for either said right side or left side of said window blind respectively. Also the clutch may include selectively engageable braking structure for preventing said shade from unrolling when said driven gear is idle.

In yet another embodiment a narrow profile control module for a window shade roll for a window opening is provided that comprises; a housing disposed at one end of said window shade roll, said housing associated with a control end wall and a first cavity portion and a second cavity portion, said first cavity portion communicating with said second cavity portion; a spur gear disposed in said first cavity portion between said control end wall and one end of said window shade roll, and defining a gap between said one end of said window shade and window opening; a clutch projecting from said spur gear into said window shade roll, said spur gear rotatably engageable with said clutch about a clutch axis for raising and lowering said window shade relative the window opening; drive gear structure disposed in said second cavity portion, said drive gear structure engageable with said spur gear for rotatably driving said clutch about said clutch axis for raising and lowering said window shade; and a rod connected to said drive gear for rotatably driving said spur gear.

In one embodiment said gap is between 5 and 8 millimeters; but other thicknesses may be used. Furthermore the drive gear structure includes a worm gear engageable with said spur gear. The drive gear disposed in the second cavity.

In one example the second cavity portion is radially disposed beyond said first cavity portion.

In yet another embodiment the housing includes a cover plate to cover said first cavity and said second cavity and said one end of said shade contacts said cover plate to define said gap between said cover plate covering said first and second cavity portions and said end wall.

In one example a wand includes one end connected to said drive gear structure and a handle at another end for manually rotating said wand, worm gear and spur gear.

Moreover in another embodiment the wand includes a shaft defining spiral grooves and hand portion coaxially receiving said shaft for reciprocal movement of said hand portion relative said shaft to rotate said wand in a selected first or second direction. The hand portion includes a slideable selector for selecting the direction of rotation of said drive gear structure.

A further aspect of this invention provides a wand for engaging a control module for a window shade for a window opening comprising: a rod extending along a longitudinal length thereof to present a longitudinal axis with opposite ends; one end presenting engagement means for engaging the control module for moving said window shade relative the window opening; motor means axially disposed at the other end of said rod for selectively rotating said rod about said axis in one direction and raising said window blind relative said window opening and rotating said rod about said axis in the opposite direction for lowering said window blind relative said window opening.

Another aspect of the wand provides for wand for engaging a control module for a window shade for a window opening comprising: a shaft extending along a longitudinal length thereof and presenting a pair of spiral grooves along a longitudinal axis thereof with opposite ends; one end presenting engagement means for engaging the control module for moving said window shade relative the window opening; a hand pumping portion coaxially receiving said shaft and engageable with said pair of spiral grooves for reciprocal movement of said hand portion relative said shaft between a first position and a second position to rotate said shaft and wand in a selected first direction to raise said window blind relative said window opening and rotate said shaft and wand in an opposite direction to lower said window blind relative said window opening, respectively.

These and other objects and features of the invention will; be described in relation to the following drawings.

IN THE DRAWINGS

Figure 5A:
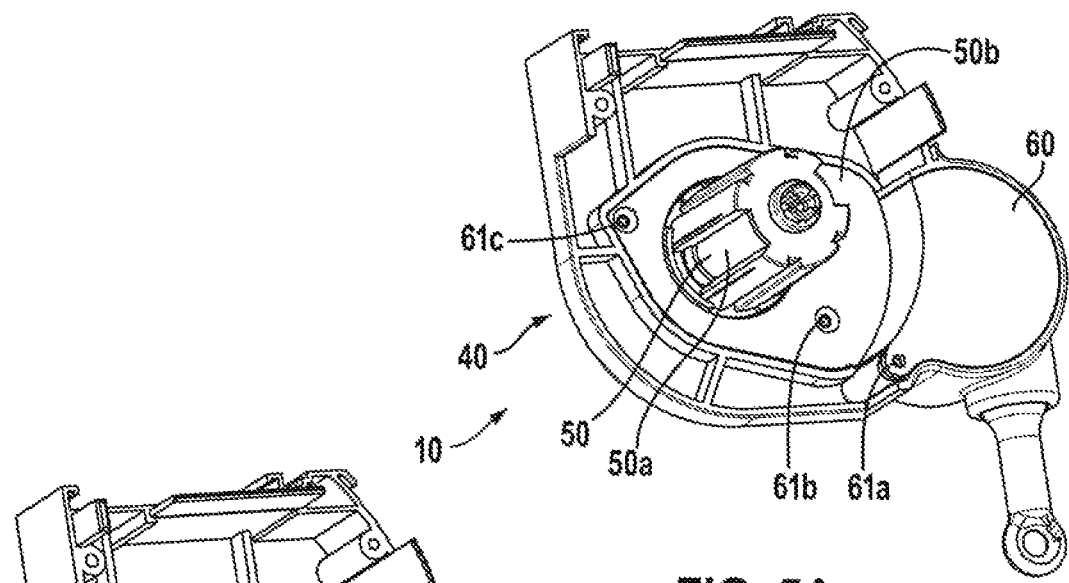
Figure 5B:
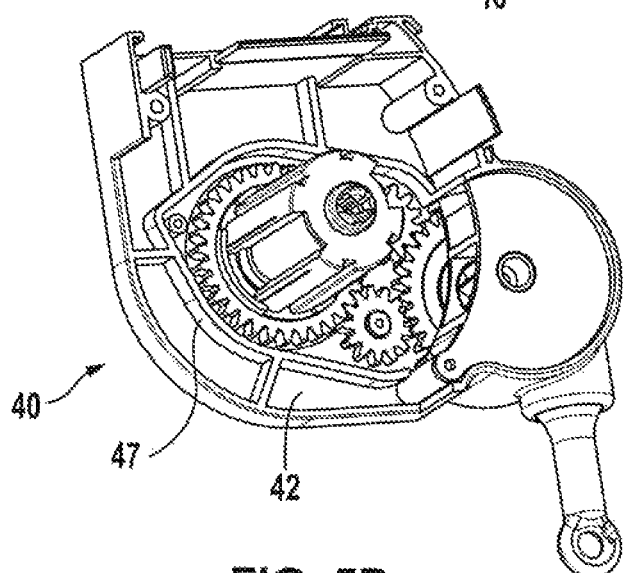
Figure 5C:
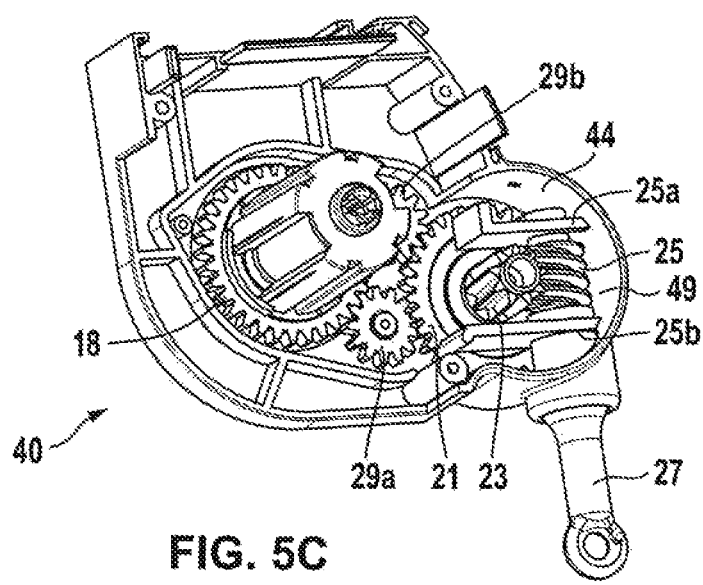

FIGS. 5A, 5B, and 5C are partial perspective views of the interior cavities of the first and second cavities at various stages of assembly.

FIGS. 6A and 6B are perspective views of the narrow profile control module for a window shade and wand.

Figure 7B:
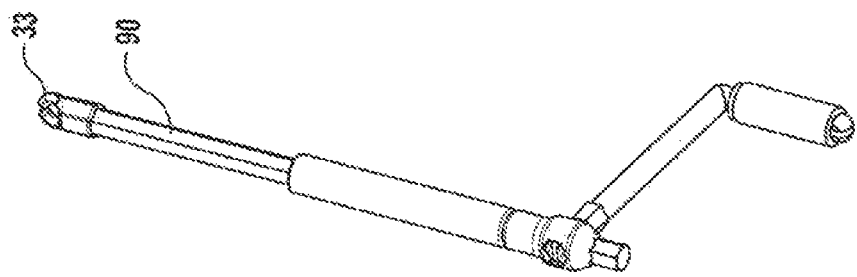
Figure 7A:
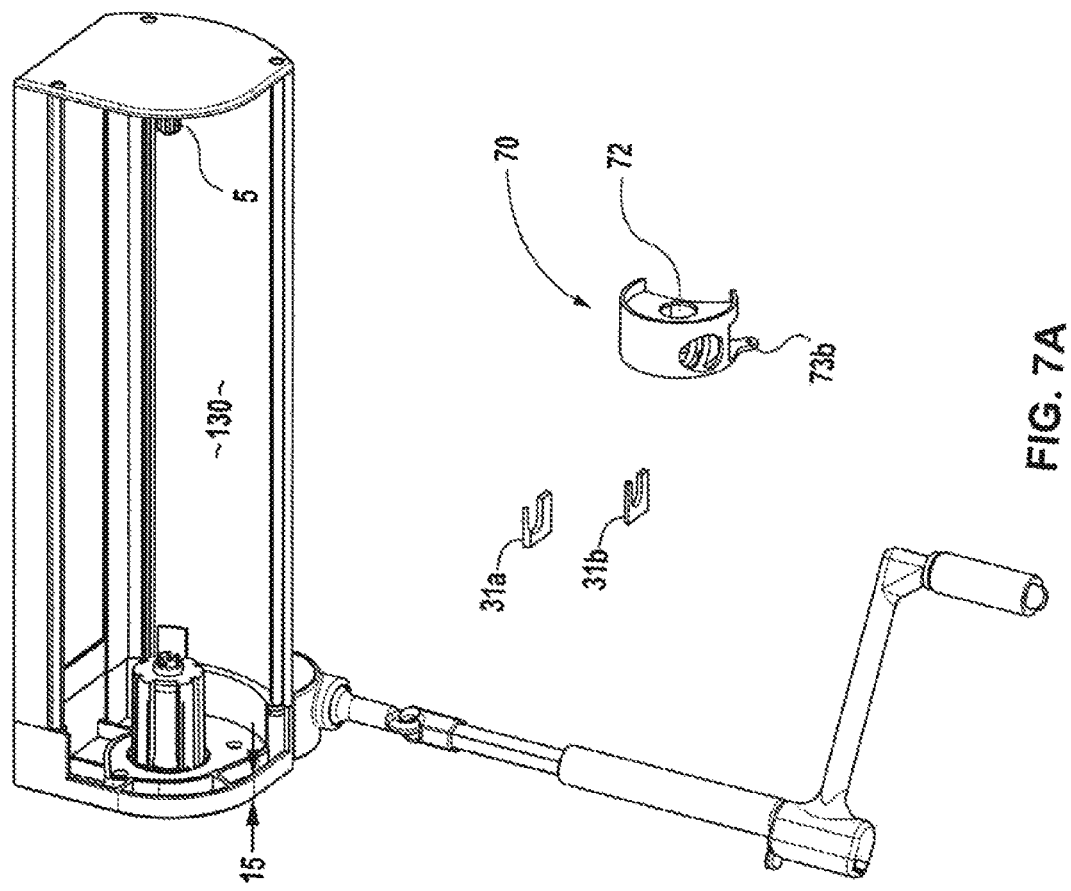

FIGS. 7A and 78 are further perspective views of the interior of the housing of the narrow profile control module for a window shade and wand.

FIGS. 8A, 8B, 8C, 8D, 8E, 8F, 8G, and 8H are various views of another embodiment of the invention.

FIGS. 9A, 9B, 9C, 9D and 9E are side views of another embodiment of the rod or wand.

Figures 10A, 10B, 10C:
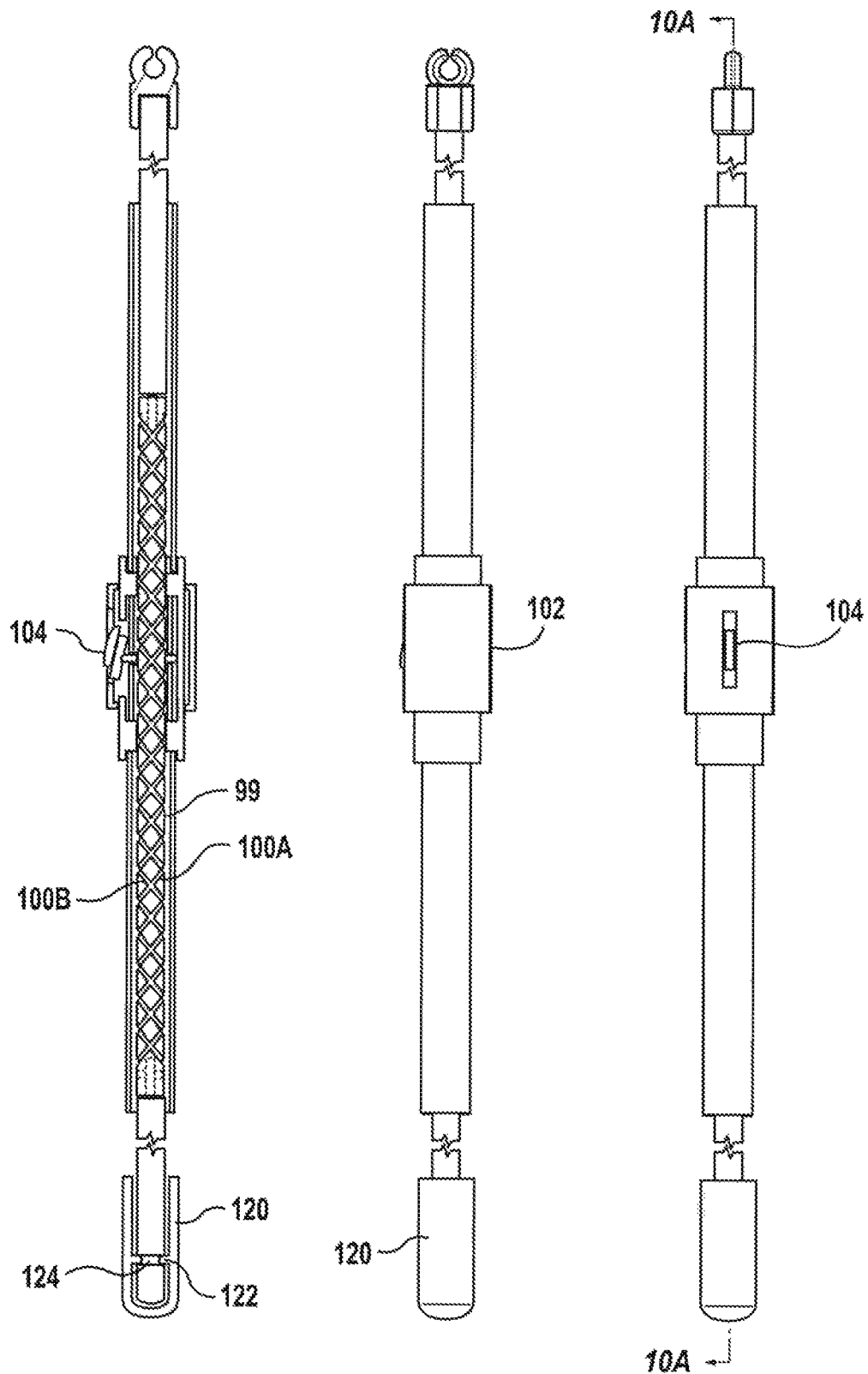

FIGS. 10A, 10B and 10C are a view of the wand having helical grooves.

FIGS. 11A, 11B, 11C, 11D and 11E are a front elevation view with the shade lowered, a rear elevation view with the shade lowered, cross sectional view with the shade lowered and a front elevation view with the shade raised, and a perspective view of the narrow profile control module, respectively.

Figure 12:
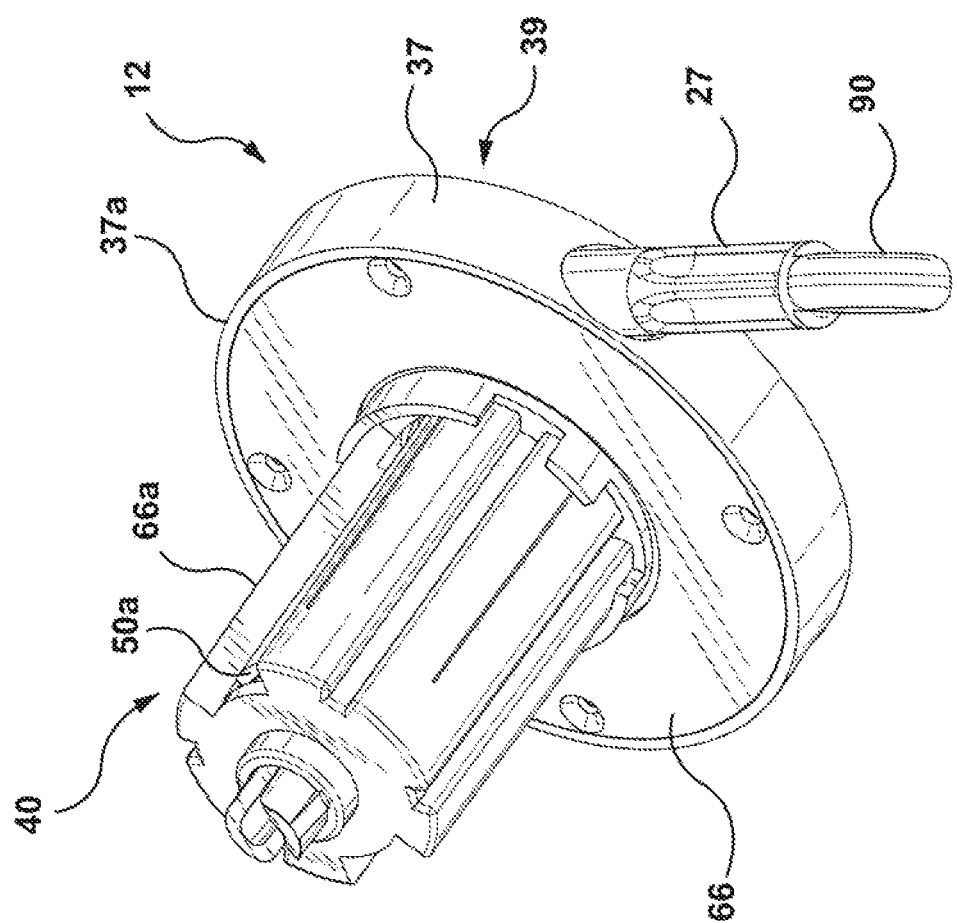
Figure 13:
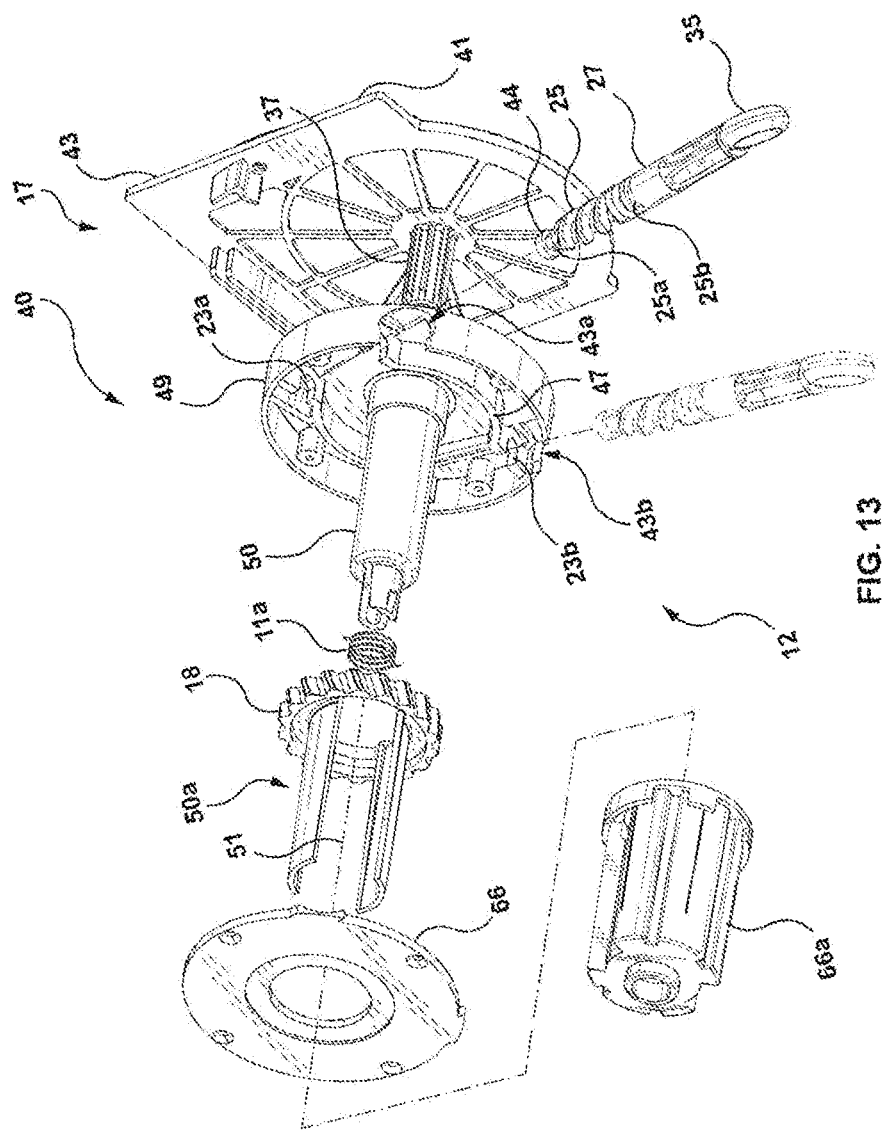
Figure 14A:
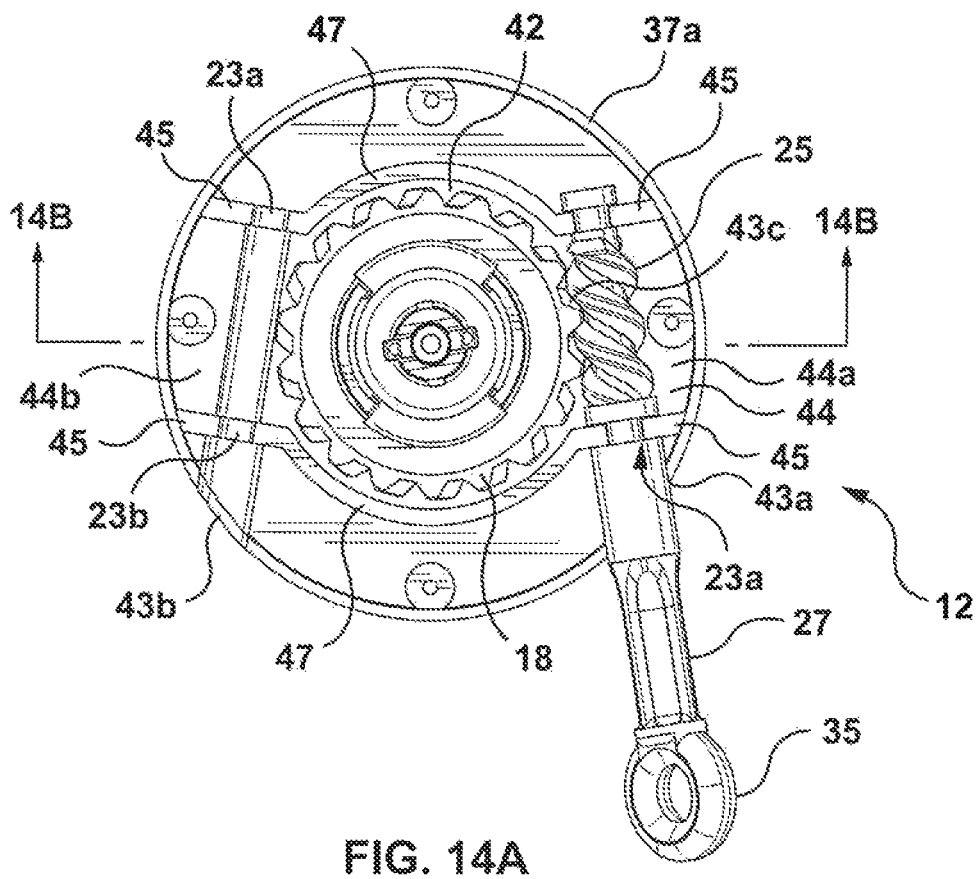
Figure 14B:
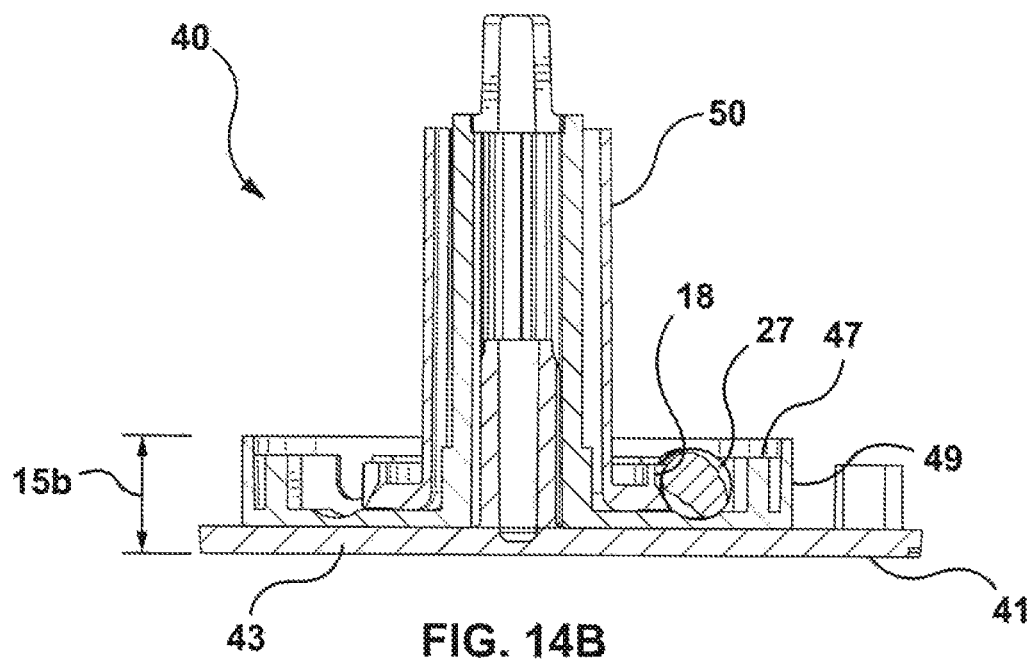
Figure 14C:
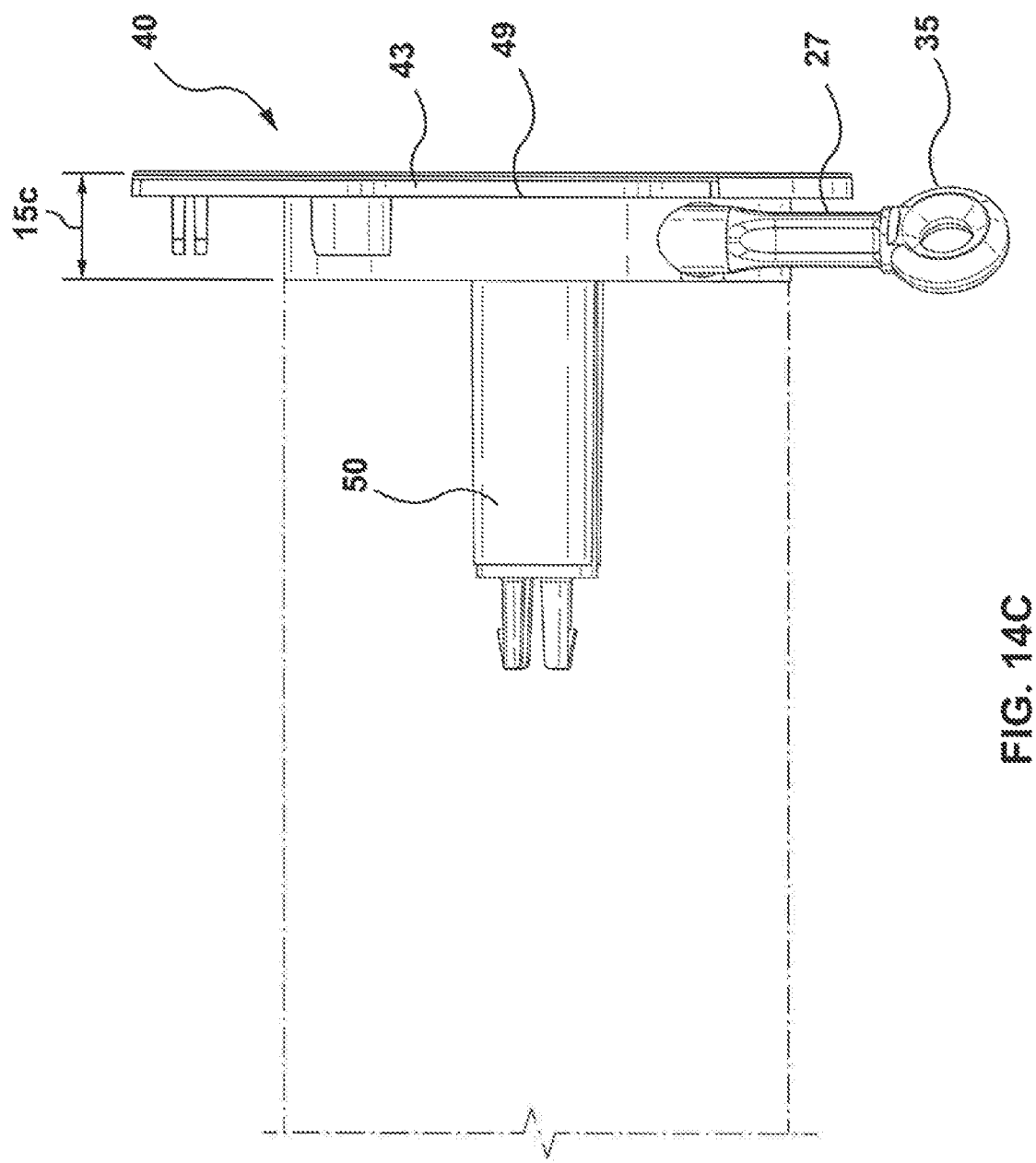

FIG. 12 is a perspective view of yet another embodiment of the invention where the blind has a narrow profile with gears between the window blind and window with worm wheel on right side FIG. 13 is an exploded view of FIG. 12 narrow profile with gears between the window and window blind similar to FIG. 12 except with worm wheel on left side;

FIGS. 14A, 14B, 14C, are a top plan view, cross sectional view, and side elevation view of FIGS. 12 and 13 with the control module on the right hand side of the blind.

Figure 15A:
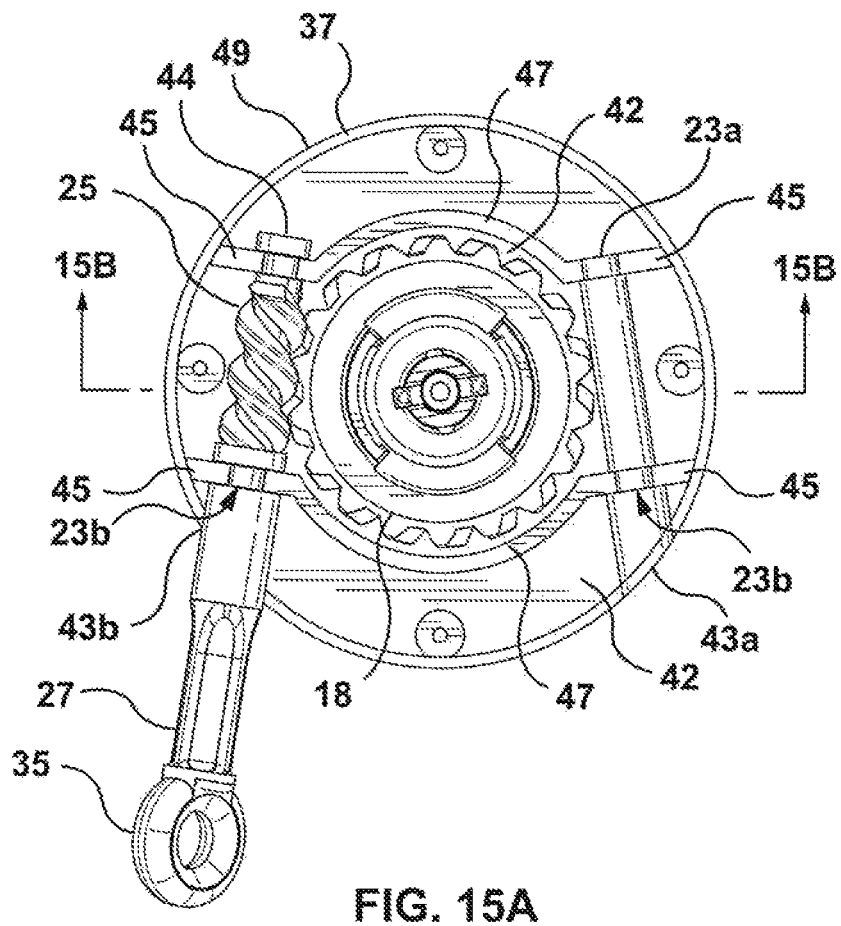
Figure 15B:
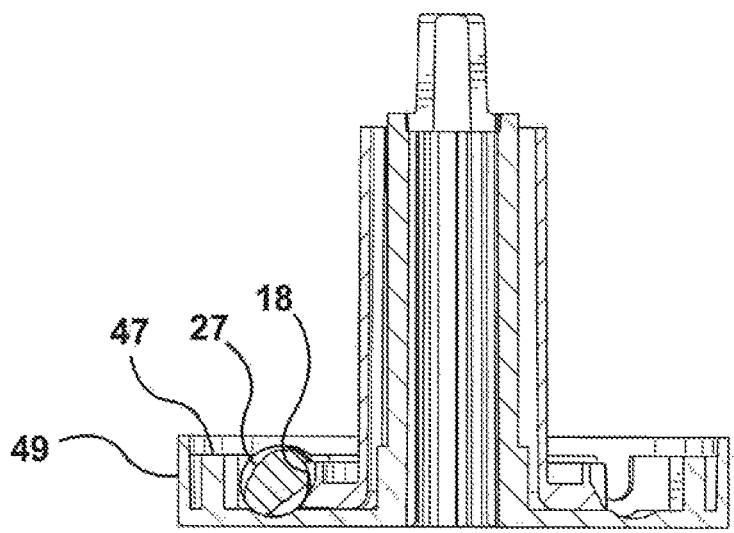
Figure 15C:
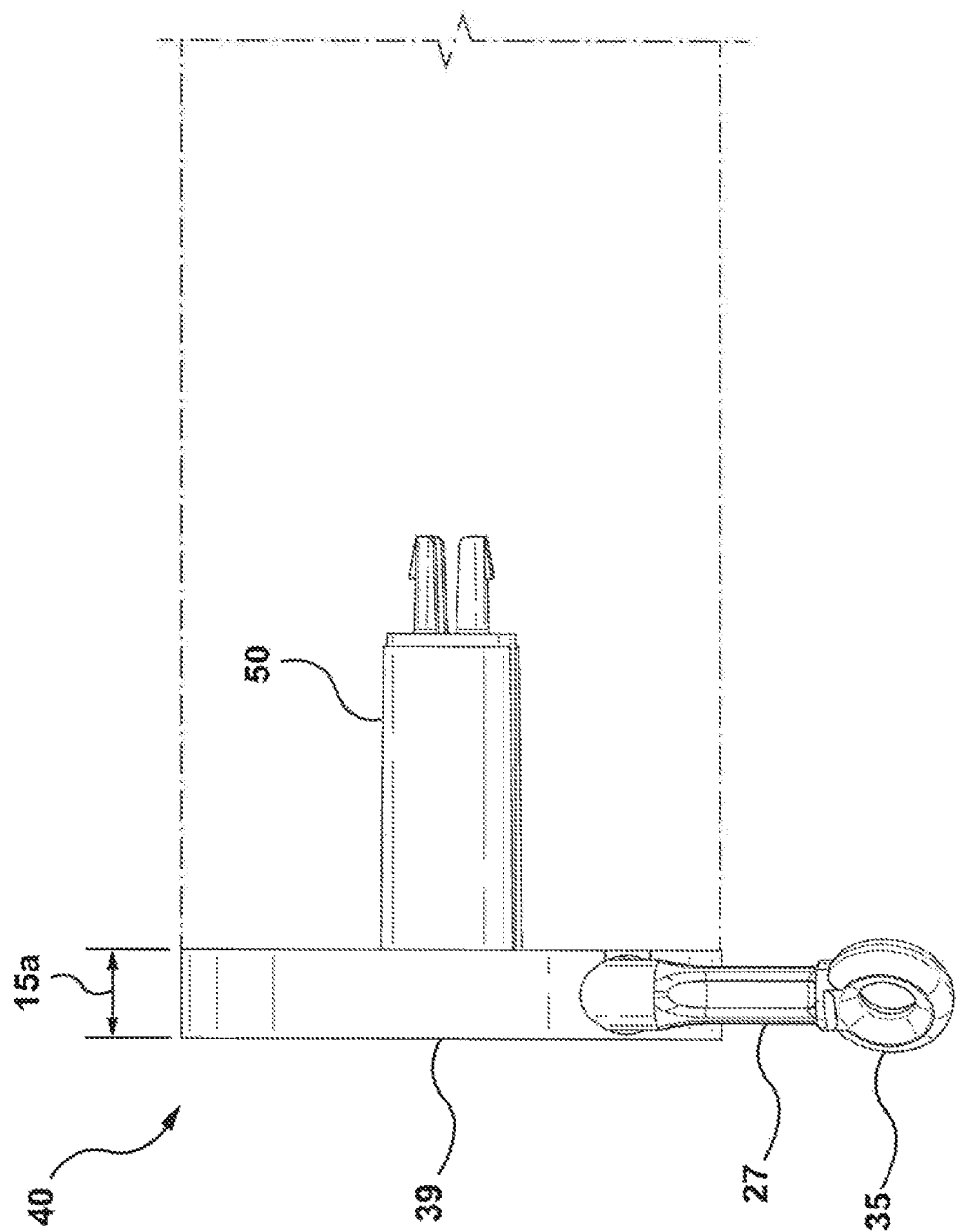

FIGS. 15A, 15B, 15C, are a top plan view, cross sectional view, and side elevation view of FIGS. 12 and 13 with the control module on the left hand side of the blind.

Figure 16A:
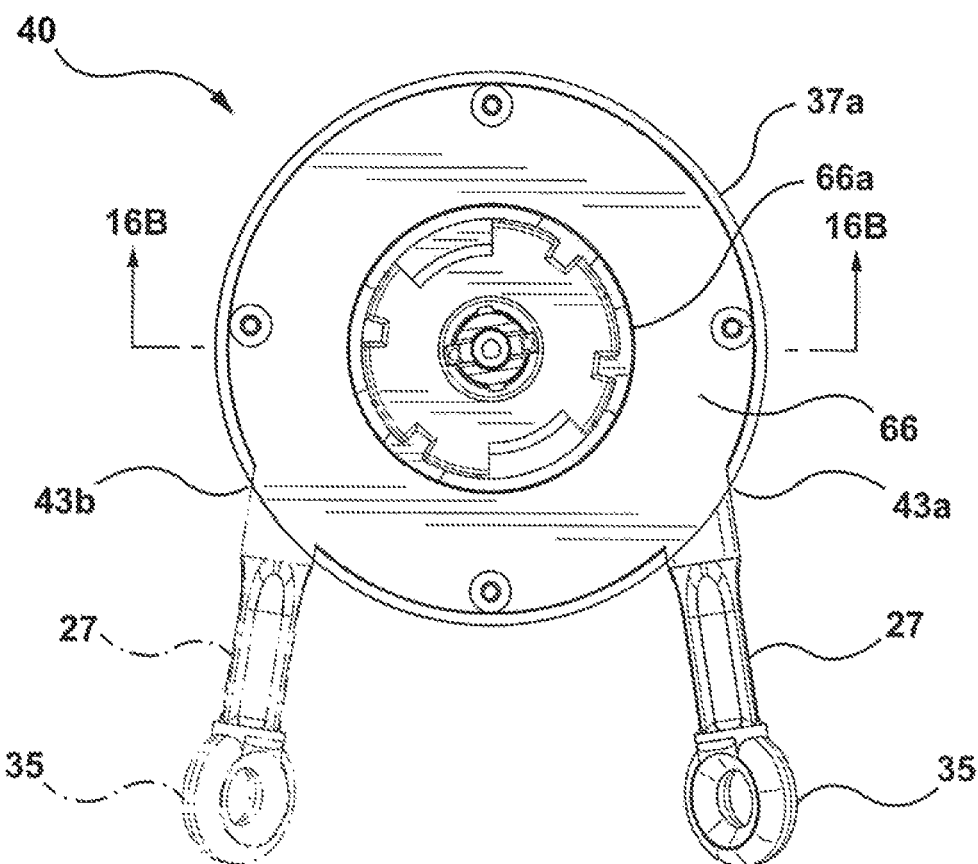
Figure 16B:
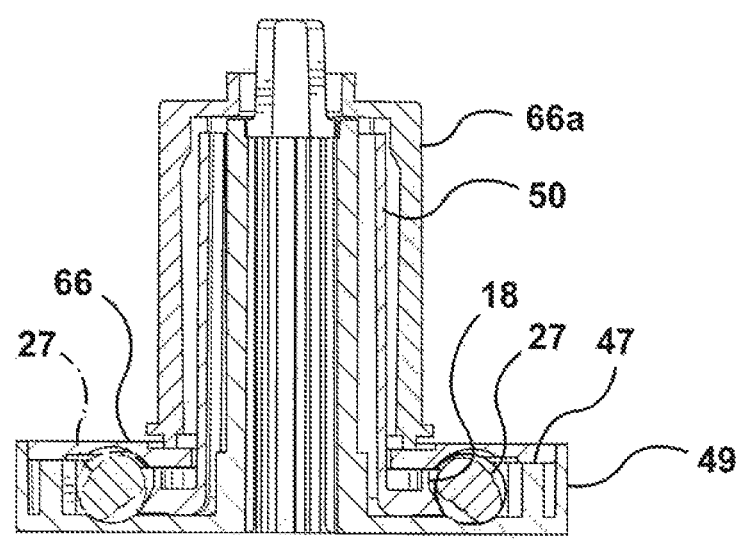
Figure 16C:
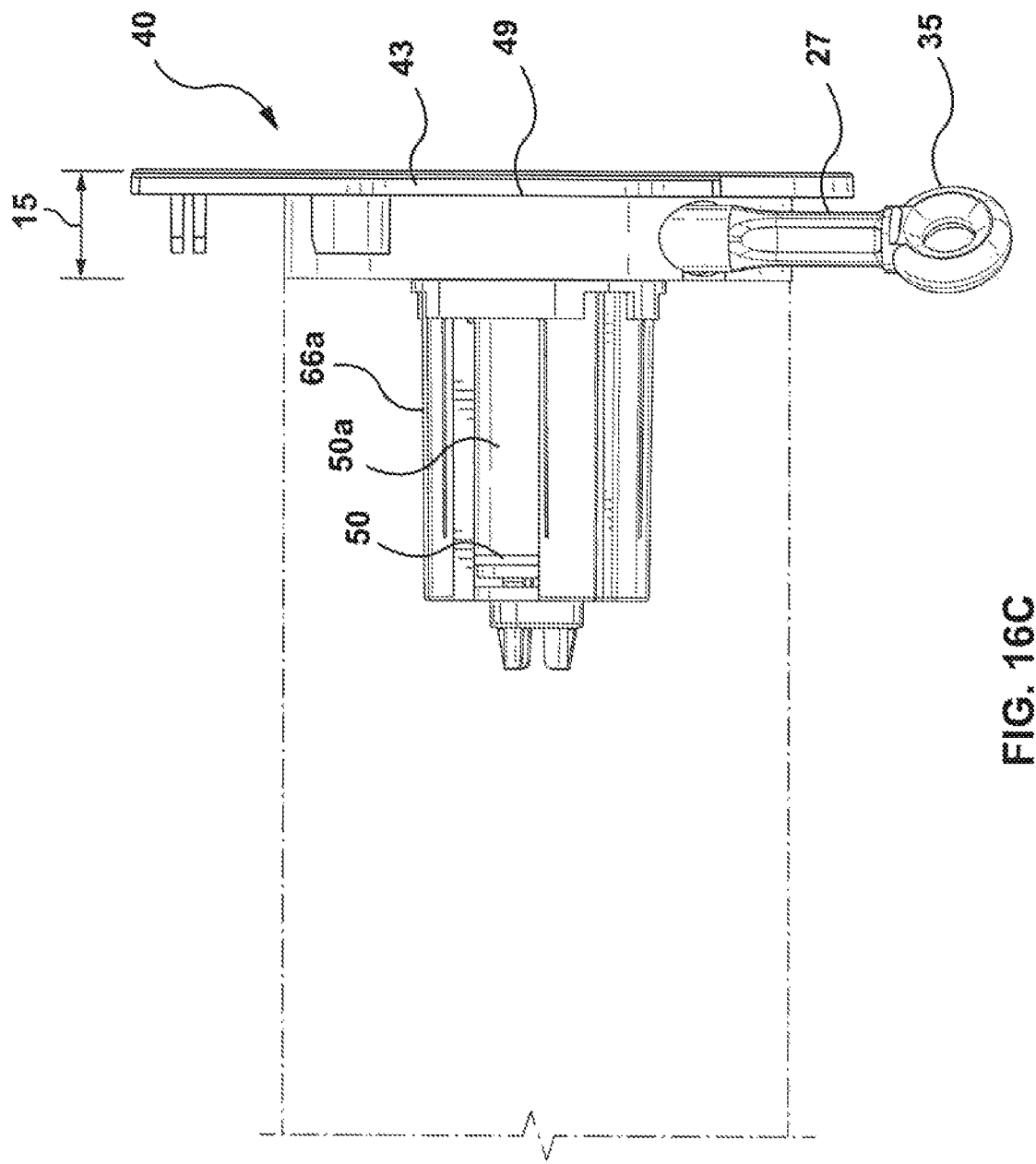

FIGS. 16A, 16B and 16C are a top plan view, cross sectional view of the control module of FIGS. 12 and 13 with the cover on, and a front view.

FIGS. 17A, 17B, 17C, and 17D are views of another embodiment of the invention where the wand can be driven by a drive motor at a lower end thereof.

DETAILED DESCRIPTION OF THE INVENTION

Like parts are given like numbers throughout the figures.

Figure 1:
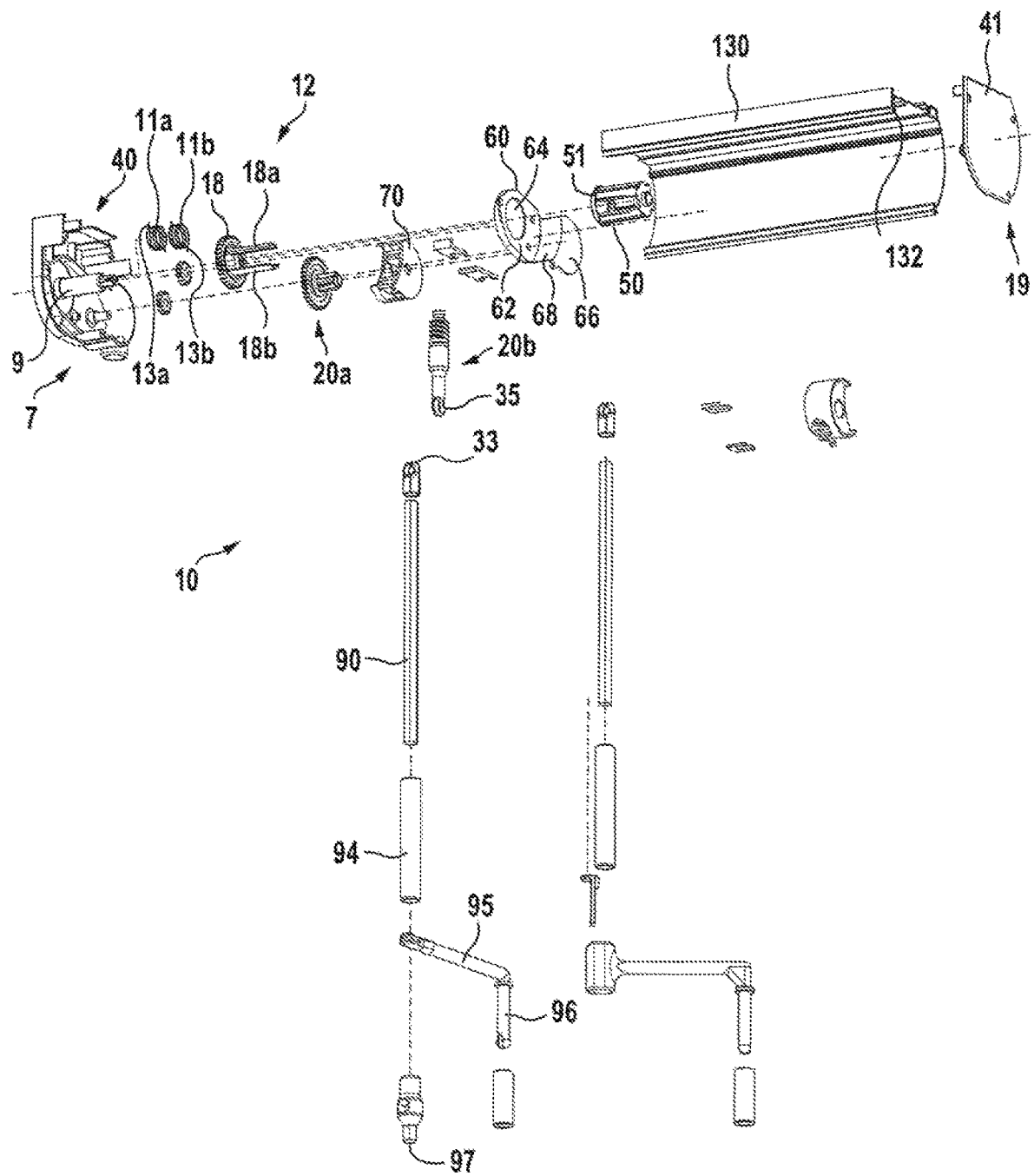
FIG. 1 is an exploded view of the narrow profile control module for a window shade.
Figure 3:
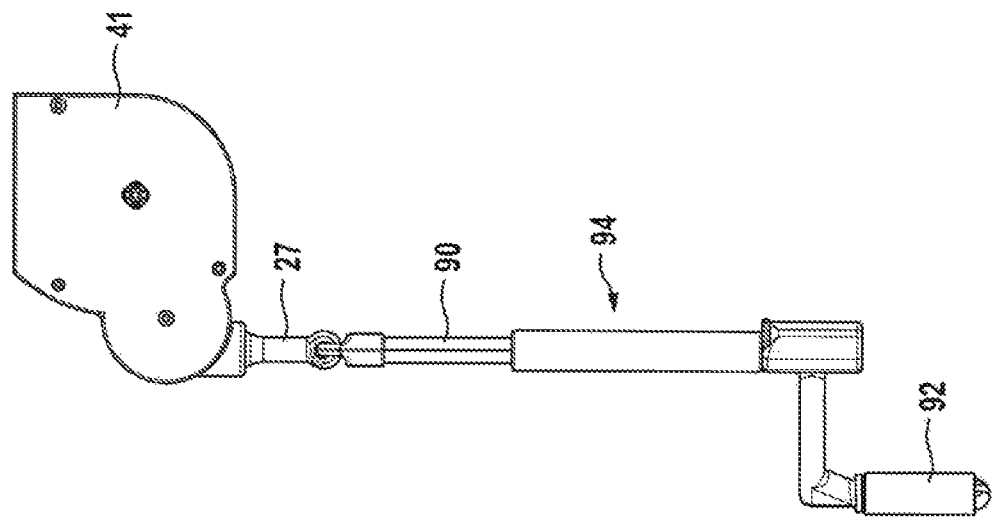
FIG. 3 is a side elevation view of the narrow profile control module for a window shade.

FIG. 1 generally illustrates a blind control 10 for a window covering having a narrow profile. In particular the blind control 10 relates to a control module 12 for a window shade 11 adapted to fit within an opening 14. The opening 14 can be an opening for a window that is comprised of drywall that has an inside edge 17 defining the opening; or in another embodiment the opening may be defined by a window frame comprised of wood or the like adjacent the window opening 14 where the window frame has an inside edge 17.

The control module 12 includes a driven gear 18 disposed between the window shade 11 (FIG. 11C) and inside edge 17 of opening 14 or window frame 16 so as to define a gap 15 between the window shade 11 and edge 17; drive gears 20a and 20b located outside the gap 15 and engageable with said window shade roll 13 for rotatably driving the driven gear 18 so as to raise and lower said window shade 11; and a rod 90 for driving said drive gears 20a and 20b.

The control module 12 includes a housing 40 having a control end 17 (FIG. 11D) and opposite pin end 19 (FIG. 11D). The control end 17 has the control elements and includes an end wall 41 (FIG. 1) adapted to be disposed adjacent said edge 17 of the window opening 14 as seen in FIGS. 4, 11A, 11B, 11C and 11D. In particular the end of the shade 11, namely one end 21 of the shade roll 13 is preferably as close to the inside edge 17 of the window opening 14 to minimize the gap 15 and block out as much of the light from the outside as possible. A clutch 50 is disposed within the housing 40 and is engageable with the shade roll 13 of window shade 11 in a manner well known to those persons skilled in the art. In particular the clutch 50 is axially rotatable about shaft 9. Two springs 11a and 11b are coaxially aligned with shaft 90. The shaft 90 and springs 11a and 11b are received within the clutch 50. The ends 13a and 13b of the springs 11a and 11b have projections that engage the openings 50a and 50b of the clutch 50 so as to prevent the clutch from unravelling in a manner well known to persons skilled in the art.

FIG. 11C shows there is another space 6 between another end of the roll 13 and an opposite edge of window opening 14 which approximately comprises the thickness of the end wall 43 of the pin end 19, since the other end of the shade roll contacts or is very close to the end wall 43. The space 6 is generally smaller than the gap 15, and the invention herein relates to the gap 15 at the control module end 7 of control module 12.

The driven gear 18 is engageable with the clutch 50. In particular the driven gear 18 includes projections 18a and 18b that are received through the hole 64 into the clutch 50. The clutch 50 is axially disposed between the window shade 11 and said end wall 41. The driven gear 18 rotatably drives said clutch 50 and shade 11 about a clutch axis for raising and lowering said shade 11 relative said window opening 14.

The drive means or gears 20a and 20b are located in a region away from the gap 15 so as to minimize the gap 15 or distance between one end 21 the shade 11 and edge 17 of window opening 14, or in particular the drive gears 20a and 20b are located away from the axis of clutch rotation so as not to interfere with the rotating clutch 50 or shade roll 13. In one embodiment the drive gears 20a, and 20b are radially spaced away from the clutch axis of rotation. In other words the drive gears 20a and 20b overlie the clutch 50 and shade roll 13 so as not to add any measurement to the gap 15.

The housing 40 includes a first housing portion 42 for receiving said driven gear 18 and a second housing portion 44 communicating with said first housing portion 42, the second housing portion 44 for receiving said drive gear means 20a and 20b.

In one embodiment the thickness of the driven gear 18 is between 5 to 8 millimeters thick. However this is given by way of example and other thicknesses can be used within the scope of this invention.

In order to constrain the relatively thin thickness of the drive gear 18 a shell plate 60 is used to cover the driven gear 18 in the first chamber 42 and for covering the drive gear 20a and 20b in the second chamber 44 and constrain said driven gear means 18 and drive gear means 20a and 20b against flexing and binding.

The first and second chambers 42 and 44 define a chamber, where the first chamber 42 includes a first chamber wall 47 and the second chamber 44 includes a second chamber wall 49, again in order to constrain the drive gear 18 and driven gears 20a and 20b against flexing and binding, in addition to the shell plate 60.

The shell plate 60 is seen in FIG. 1 and comprises a first shell plate portion 62 having a hole 64 to receive the clutch 50 there through and a second shell plate portion 66. The shell plate 60 has an offset connecting surface 68 connecting the first shell cover portion 62 and the second shell cover portion 66. The offset connecting surface 68 or offset or distance between the first shell plate portion 62 and second shell plate portion 66 provides a means of locating the drive gears 20a and 20b away from the gap 15 to minimize the gap 15.

More particularly the drive gear 20 comprises a gear 21 connected to pinion gear 23 as best seen in FIG. 5C. The drive gear 20 also includes a worm wheel 25 coaxially connected to drive shaft 27. The gear 21 rotationally drives intermediate gears 29a and 29b which in turn rotationally drive the drive wheel 18.

A drive gear cage 70 is disposed in the second chamber 44. The cage or shell 70 lies flat against the gear 21 as shown in FIG. 5B. The cage 70 includes a hole 72 for receiving spur gear 23 for rotation therein. The shaft 27 of the spur gear 25 includes two spaced annual recesses 25a and 25b which are adapted to receive retaining clips 31a and 31b (FIG. 6A) respectively. The drive gear cage or shell 70 has openings 73a and 73b (FIGS. 5C, 6A) which are adapted to receive retaining clips 31a and 31b respectively that engage with annual recesses 25a and 25b as discussed so as to contain, constrain and retain the drive gear means 20 in a small compartment to rigidify a reduced thickness of the drive so as to minimize the gap 15.

The shell cover 60 includes fastening holes 61a, 61b, and 61c adapted to receive fastens such as screws to tighten the shell or cage cover 60 to the housing 40 and further rigidify the control module 12 against binding.

The drive gear cage 70 is offset away from the plane of the driven gear 18 and gear 21 in a direction away from the end wall 42 and thus away from the gap 15. In other words the spur gear 23 and worm wheel 25 do not contribute to gap dimension thus providing a narrow profile control module as described.

In one embodiment the driven gear 18 comprises a spur gear 18 disposed at said one end 51 of said clutch 50 between said end wall 41 and said one end of said shade so as to define a narrow gap 15 between said one end of said shade and said frame 16 of said window.

In another embodiment the control module 12 comprises at least one intermediate gear 29a or 29b between said spur gear 18 and said drive gear means 20. The drive gear means 20 in one example is a worm wheel.

The clutch 50 includes selectively engageable braking means for preventing said shade from unrolling when said driven gear or spur gear 18 is idle and includes springs 11a and 11b. The clutch braking means is well known to those persons skilled in the art and will not be described herein.

The invention described herein relates to a narrow profile control module 12 for a window shade roll 13 comprising; a housing 40 disposed at one end of said window shade roll 13, said housing 40 having a control end wall 41 and a first cavity 42 and a second cavity 44, the first cavity 42 communicating with said second cavity 44; a spur gear 18 disposed in said first cavity 42 between said end wall 41 and one end of said window shade roll 13, and defining a gap 15 between one end of said window shade 13 and said edge 17 of the opening 14; a clutch 50 projecting from said spur gear 18 into said window shade roll 13, said spur gear 18 rotatably engageable with said clutch 50 about a clutch axis for raising and lowering said window shade 11; a drive gear means 20 disposed in said second cavity 44 away clutch axis so as to not interfere with said gap 15 adjacent said end wall 41, said drive gear means 20 engageable with said spur gear 18 for rotatably driving said clutch 50 about said clutch axis for rotatably driving the clutch about the clutch axis for raising and lowering the window shade 11; a rod 90 connected to the drive gear for rotatably driving the spur gear.

In one embodiment the gap is defined as the space between the inside edge 17 of the window opening 14 or frame 16 and one end 21 of the window shade 11 or roll 13.

FIGS. 8A, 8B, 8C, 8D, 8E, 8F, 8G, and 8H are various views of another embodiment of the invention where the drive means 20a and 20b is a bevel gear 80a and 80b. The end of the rod 90 also has a bevel gear 80b.

FIGS. 2, 3, 6A and 68 show that the rod 90 has a handle 92 that can be used to manually rotate the drive shaft 27 to rotate the drive means 20. The rod or wand 90 also includes a hollow sleeve 94 that can be grasped in one hand while the other hand manually rotates the rod 90 by handle 92.

Alternatively FIGS. 9A, 9B, 9C and 9D are side views of another embodiment of the rod or wand 90. In this case the sleeve 94 is longer than in FIG. 1 and can be moved axially upward or downward so that intermediate horizontal piece 95 and vertical piece 96 are exposed and articulated 90 degrees relative to one another. The drive means 20 can be manually driven in this fashion. Alternatively the sleeve 94 is moved downwardly to cover articulated joints 98 and 99. Once the articulated joints 98 and 99 are covered by sleeve 94 a motor drive (not shown) can engage a socket adapter 97 and rotatably drive the rod 90. The sleeve 94 is long enough to cover the articulated joints 98 and 99 so that the rod does not become twisted when rotated by the motor drive.

Figure 9E:
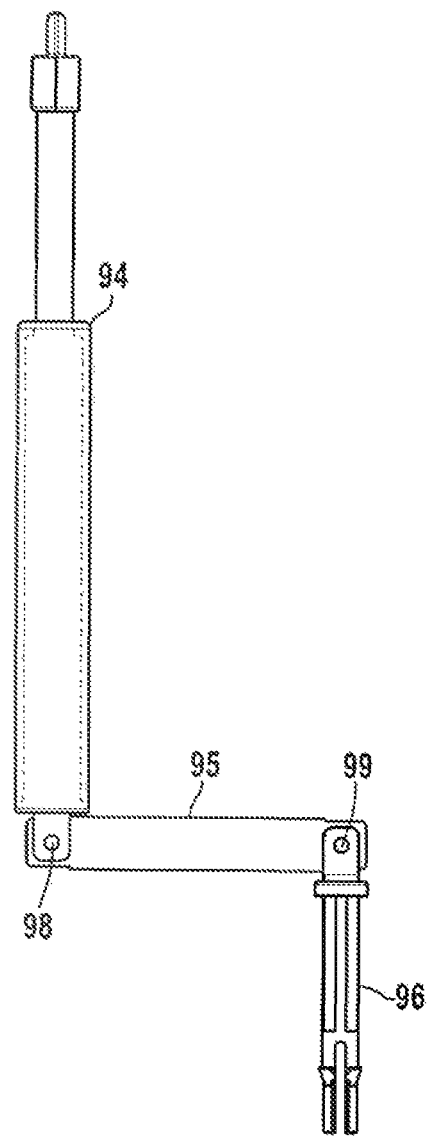

The sleeve 94 has an upper end that has a shoulder 110 which engages a connecting piece 112 when in the lower position as shown in FIG. 9A. The bottom end 114 is tapered so as to self-align as the sleeve 94 moves from the upper position shown in FIG. 9E to the lower position shown in FIG. 9A.

FIGS. 10A, 10B and 10C illustrate a rod or wand 90 which includes a first shaft 99 defining spiral grooves 100a and 100b and hand pumping portion 102 coaxially receiving said first shaft 99 for reciprocal movement of said hand portion 102 relative said first shaft 99 to rotate said shaft 99 and wand in a selected first or clockwise rotation or second or counter clockwise direction. The hand portion includes a slideable selector 104 for selecting the direction of rotation of said drive gear means 20.

FIGS. 10A, 10B and 10C also illustrate a hand grasping portion 120 which can be grasped by an individual grasping the hand pumping portion 102 by another hand and reciprocately pumps the hand pumping portion 102 up and down in a reciprocating fashion between a first reciprocating position and a second reciprocating position so as to rotate the first shaft 99.

The hand grasping portion 120 is hollow and includes two projections 122 which engage an annular groove 124 as shown; so as to permit rotation of the first shaft 99 relative the hand grasping portion 120.

Furthermore, FIG. 1 illustrates that the controls (driven and driver gears) are housed in the housing 40 while the other opposite end includes a pin end 19. The interior surface of the pin end 19 includes a post which receives a revolving pin 5 as best seen in FIG. 11C which coaxially receives the other end 43 of the shade roll 13 for rotation of a clutch axis and shade roll axis.

FIG. 1 also shows an exploded view of a cassette 130 which can be comprised of aluminum or plastic or the like and includes a plurality of extensions or rails that are adapted to engage (not shown) for attachment adjacent a window opening 14. The brackets 132 allow a user to fasten the bracket (not shown) to adjacent the window opening 14 first and thereafter snap the cassette 130 in place for easy installation.

The arrangements shown in FIG. 1 can be reversed so that the control end 7 is located on the opposite end depending on which side of the window cassette the user desires to place the wand 90. The control end 7 shown in FIG. 1 consists of a right control cap while the opposite pin end 19 comprises a left end cap. However these can be reversed.

Figure 2:
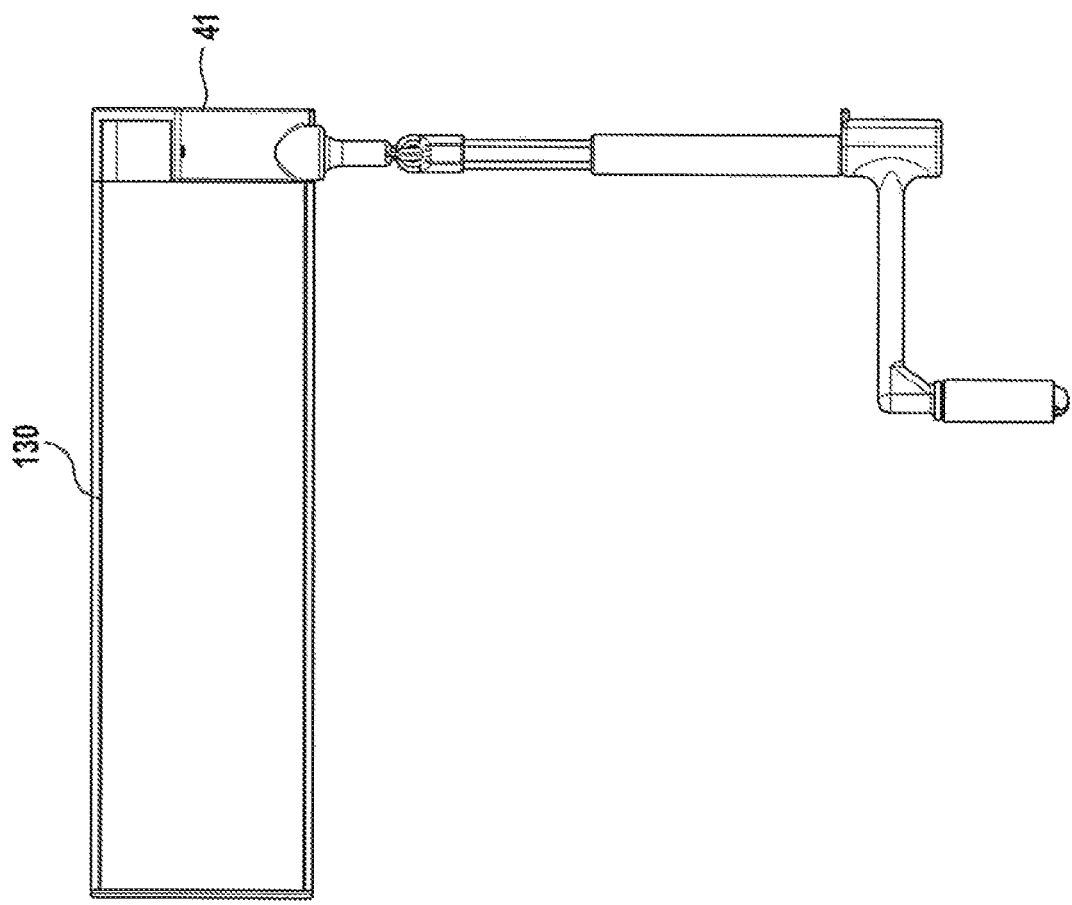
FIG. 2 is a front elevation view of the narrow profile control module for a window shade.
Figure 4:
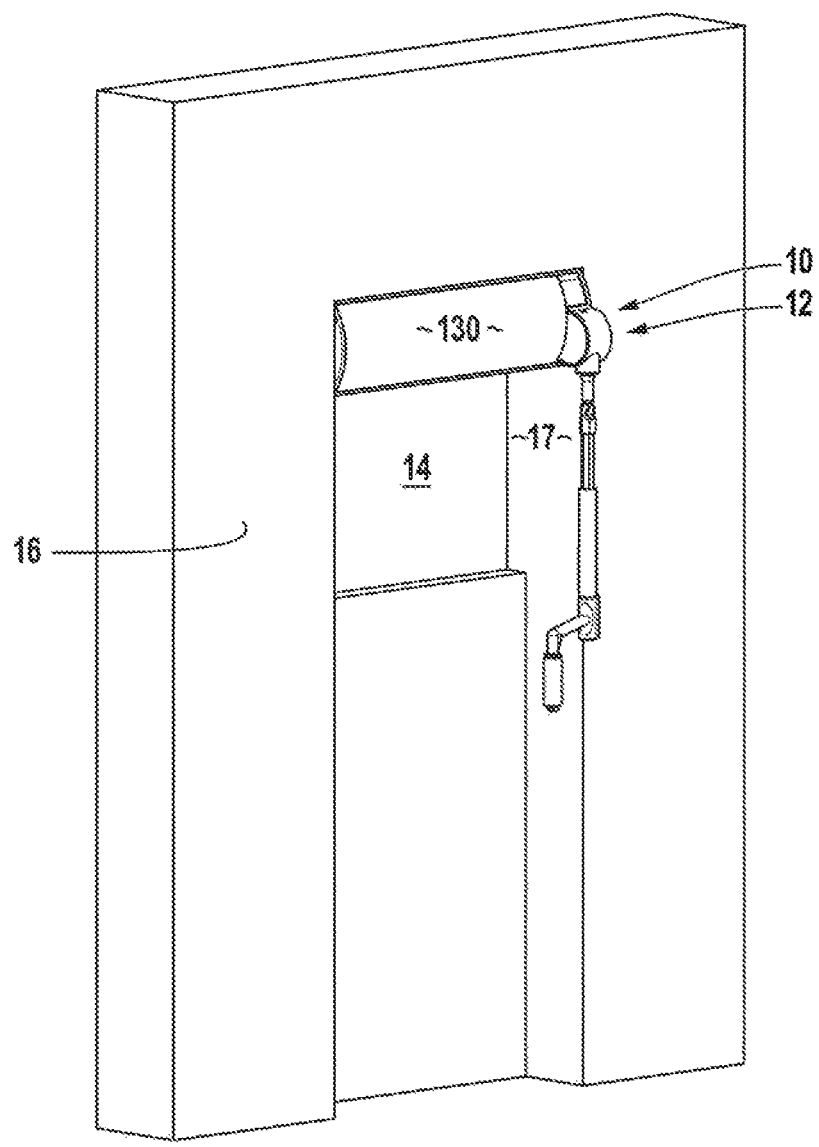
FIG. 4 is a perspective view of the control module.

The left side of the cassette 130 of FIG. 2 presents the pin end cap while the right side of FIG. 2 presents the right control cap.

The cassette 130 covers the internal mechanism of the control elements.

FIGS. 12-17D illustrate yet another embodiment of the invention where the blind has a narrow profile with gears between the window blind or shade 11 and a window opening 14 as previously discussed.

In particular FIGS. 12-17D show the control module 12 for a window shade 11 for a window opening 14 which comprises a housing 40 having an end 39 and the blind has an opposite pin end 19 as previously described in relation to FIG. 11D. The housing 40 includes a first housing portion 42 for receiving a driven gear 18 and a second housing portion 44 communicating with the first housing portion 42 where the second housing portion 44 receives the drive gear 25. The housing 40 is disposed at one end of the window shade 11 and the window opening 14 to define a gap 15 there between as previously described. The first housing portion 42 defines a first cavity or first cavity portion 42 and the second housing portion 44 defines a second cavity or second cavity portion 44.

The second cavity 44 communicates with the first cavity 42 and is radially disposed beyond the first cavity 42. A driven gear 18 is disposed in the first cavity 42. A drive gear 25 is located within the second cavity 42 and is engageable with the driven gear 18 for rotatably driving the driven gear 18 so as to raise and lower the window shade 11 relative to the opening 14. The first cavity 42 and second cavity 44 have a common aperture or communication path 43c for the drive gear 25 to engage or mesh with the driven gear 18. Furthermore a rod as shown in either FIGS. 9A-9E or as shown in FIGS. 10A-10C may be used as previously described.

In another embodiment the control module 12 illustrates a housing 40 having an end wall 39 adjacent to the inside edge of the window opening 14, a clutch 50 projecting from the housing 40 and engageable with the window shade 11 to define gap 15a.

In another embodiment a mounting plate 43 can be used to engage the end 39 of the housing 40. The mounting plate 43 includes an alignment pin 37 to axially mount and engage the plate 43 with the clutch assembly 50 as shown in FIG. 13. The mounting plate 43 presents an end wall 41 for contact with the edge 17 of the window opening 14 to define gap 15b.

The housing 40 generally includes an end or bottom wall or surface 39, and upstanding side wall 37. The housing 40 also includes a cavity having spaced circular cavity walls 47 connected at the ends thereof to spaced generally straight cavity walls 45 to define the first cavity portion 42 and second cavity portion 44, namely portions 44a and 44b. The region between spaced generally straight cavity walls 45 include apertures 23a, and 23b, that are adapted to engage with annular recesses 25a, and 25b, presented by the shaft of the worm wheel 25.

The driven gear 18 is either engageable with the clutch 50 or disposed at one end of the clutch 50 as shown; and disposed between the window shade and the end wall 41 adjacent with the edge 17 of the window opening 14.

In one embodiment the drive means 25 comprises a drive gear disposed in the second cavity 44 adjacent the end wall 39 and engageable with the driven gear 18 for rotatably driving the clutch 50 and shade 11 about a clutch axis 51 for raising and lowering the shade 11 relative to the window opening 14. The drive means 25 and driven means 18 are disposed in a region within the gap 15. The drive gear 25 and driven gear 18 are generally disposed in a common plane (occupying the gap region 15) disposed generally perpendicular to the clutch axis 51.

The control module 12 also includes a shell plate 66 for covering the driven gear 18 in the first cavity portion 42 and for covering the drive gear means 25 in the second cavity portion 44 and constrain the drive gear means 25 and driven gear 18 against binding. The covering 66 in FIGS. 12-15 is generally flat.

The first cavity portion 42 and second cavity portion 44 are radially spaced along the clutch axis.

In one embodiment the driven gear 18 comprises a spur gear 18 disposed at one end of the clutch 50 between the end wall 41 and one end of the shade 11 and disposed in the gap 15 (15a, 15b) between the one end of the shade 11 and the edge 17 of the window. In one embodiment the thickness of the spur gear 18 along the clutch axis is between 5 to 8 millimeters by way of example; although other dimensions can be used.

In one embodiment the drive gear 25 comprises a worm gear as shown in the figures.

In a further embodiment the control module 12 has a second cavity 44 (44a, 44b) which has a first and second opening 43a and 43b communicating with the second cavity 44 whereby the worm gear 25 is selectively disposed adjacent the first opening 43a or second 43b opening for engaging with the spur gear 18 in the first cavity 42 so as to present a control module 12 for either the right side or left side of the window blind respectively as shown in FIGS. 14A-14C or FIGS. 15A-15C, respectively.

As previously discussed the clutch 50 can include selectively engageable braking means 11a for preventing the shade 11 from unrolling when the driven gear 18 is idle; or as discussed below the braking means may be eliminated as discussed below.

In an embodiment described herein the gear ratio between the worm gear or wheel can be selected at 8:1, 9:1, or 4:1 by way of example. In other words the ratio can be selected so one rotation or the worm gear 25 will rotate 2 teeth of the spur gear. Therefore with a ratio of 8:1, 8 full rotations (i.e. 360 degrees) of the worm gear 25 (and the wand) will rotate the spur gear 18 once.

Furthermore by making the gap 15 (and size of the worm wheel 25 and drive gear 18 smaller to fit within the gap 15, 15a or 15b) more turns of the worm gear 25 and wand will be required. The wider or thicker the worm gear 25 and spur gear 18 the less turns are required and the more inertia is created (due to the larger size of the worm wheel 25 and spur gear 18) so that the braking springs 11a may not be required, depending on the length of the window blind roll 11. For larger widths of window blind rolls it is prudent to use the braking means 11a and 11b due to the increased weight of the blind roll.

Furthermore the wand shown in FIGS. 10A-10C can be selected so that one reciprocal stroke (the hand control 102 being moved from an upper position to a lower position will cause the wand to rotate 4 and a half turns. In some of the prior art cranks as for example in Canadian Patent 2353114 the crank will have to be rotated 20 turns to move the window blind in approximately the same vertical length as it takes for one stroke of the wand shown in FIGS. 10A to 10C or 4 and a half turns for the hand crank shown in FIGS. 9A-9E when used in the embodiments shown herein.

Figure 8D:
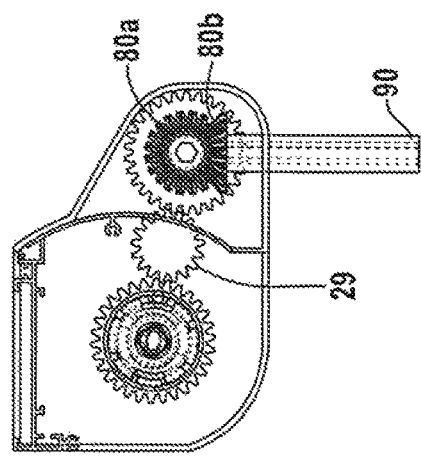
Figure 8H:
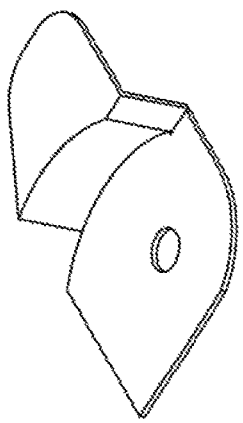
Figure 8C:
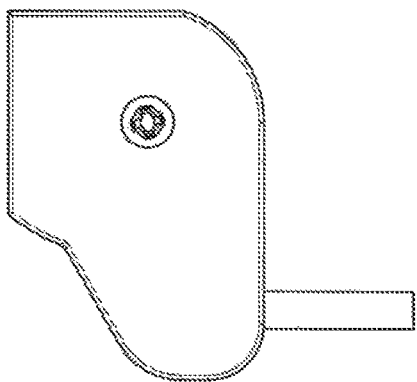
Figure 8G:
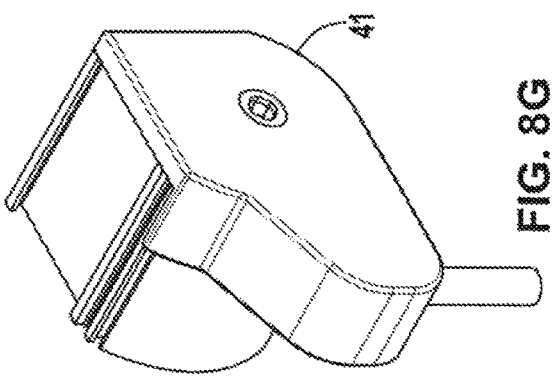
Figure 8B:
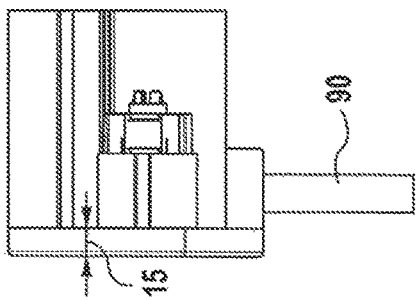
Figure 8A:
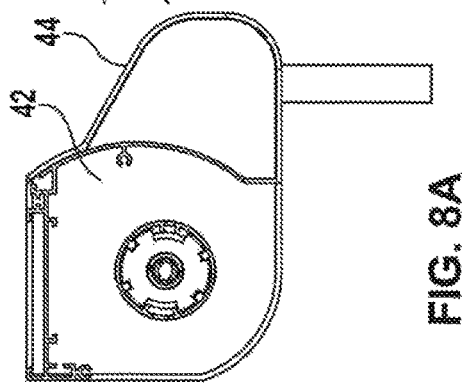
Figure 8F:
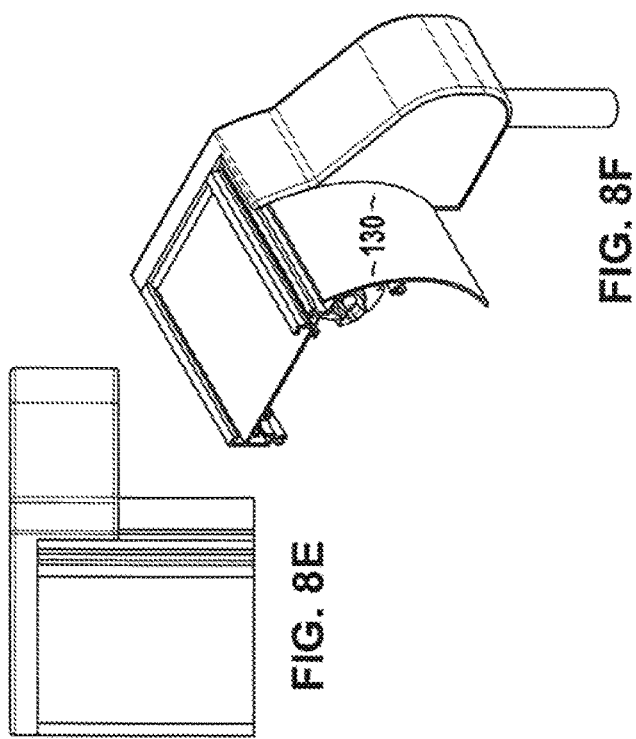
Figure 8E:
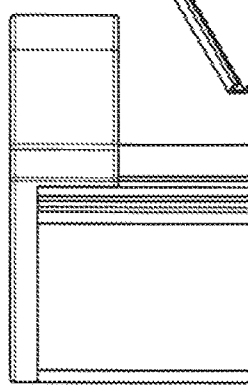

In one embodiment the bevel gear ratio shown in FIG. 8D can be selected at 4:1 so 4 turns of bevel gear 80B will turn bevel gear 80a in one full revolution. Other ratios can be selected; although in one embodiment of the invention it is desirable to keep select the sizes to generate a low gear ration so as not to tire a person using the wands in the event the person needs to turn the crank many many times to raise or lower the window blind 11.

Finally the invention as described in the embodiment shown in FIGS. 12-15 relates to a narrow profile control module 12 for a window shade roll for a window opening 14 which comprises:

(a) a housing 40 disposed at one end of the window shade roll 11, the housing 40 having or engaging a control end wall 39 or 41 respectively and a first cavity 42 and a second cavity 44, 44a or 44b where the first cavity 42 communicates with the second cavity 44;

(b) a spur gear 18 disposed in the first cavity 42 between the control end wall 41 and one end of the window shade roll 11 and defining a gap 15 between the one end of the window shade 11 and the window opening;

(c) a clutch 50 projecting from the spur gear 18 into the window shade roll 11, the spur gear 18 rotatably engageable with the clutch 50 about a clutch axis for raising and lowering said window shade 11 relative to the window opening 14;

(d) a drive gear means 25 disposed in a second cavity 44, the drive gear means 25 engageable with the spur gear 18 for rotatably driving the clutch 50 about the clutch axis for raising and lowering said window shade 11; and (e) a rod connected to the drive gear 25 for rotatably driving the spur gear 18.

Furthermore the housing 40 includes a cover plate 66 to cover the first cavity 42 and the second cavity 44 and where said one end of the shade 11 contacts the cover plate 66 to define the gap 15 between the cover plate 66 covering the first and second cavities 42 and 44 and the end wall 41.

The clutch 50 includes cover 66a.

The embodiment shown in FIGS. 12-17D can operate with the previously described wand which includes one end connected to the drive gear means 25 and a handle at another end for manually rotating the wand and the spur gear 18.

A further embodiment of the wand is shown in FIG. 17A. The wand can comprise of a one piece rod 90 with a drive motor 67 at a lower end of the rod 90. The drive motor 67 can have a battery. Alternatively the drive motor 67 can be removeably detachable from rod 90 in which case the drive motor 67 has a connection to the rod 90 such as a female socket 93 that engages a male extension 91 located at the lower end of the rod 90. The drive motor 67 includes a push button 65 that can be activated to rotate the rod 90 in one direction so as to move the blind 11 in one direction ie up; or to push the push button 65 in another direction to rotate the rod 90 in an opposite direction so as to move the blind or shade 11 in another direction ie down. Alternatively the drive motor 67 and rod 90 can be made as a single piece. Furthermore in yet another embodiment the drive motor can be activated by a remote (not shown)

Furthermore the motor drive 67 can also be used in combination with the articulated wand 90 shown in FIGS. 9A, 9B, 9C and 9D; ie when the rod or wand 90 is in the straight configuration shown such that the motor drive 67 can axially engage the lower end 97 and raise or lower the blind or shade 11.

The other end of the wand or rod 90 includes an engagement means 33. In one embodiment the engagement means 33 can comprise a hook 33a as shown in FIG. 17B or spaced fingers 33b to engage with the lower portion 35 of worm gear 25 as shown in FIGS. 17C and 17d.

More particularly FIG. 17C illustrates that the lower portion 35 of worm gear 25 can comprise an "O" shaped receiver for selective engagement of the upper portion 33 of wand or rod 90. FIG. 17c shows that a portion of the "O" shaped receiver is narrowed or restricted at 35 such that the spacing between fingers 33b is slightly larger than the restriction 35a so as to snap into place.

The motor drive 67 is appealing where there are multiple window blinds 11 in a room that need to be raised or lowered relative the window, so as to minimize human effort. In other words the wand with the motor drive 67 can be easily moved from on window to another.

Another embodiment of the wand as previously described includes a shaft defining spiral grooves 100A and 100B and a hand portion co-axially receiving the shaft 99 for reciprocal movement of the hand portion relative to the shaft 99 to rotate the wand in a selected first or second direction. The hand portion 102 includes a slideable selector 104 for selecting the direction of rotation of the drive gear means 25.

In another embodiment the wand 90 as shown in FIG. 10A to 10C can be adapted such that the lower end present the male end 91 as described in relation to FIGS. 17A-17D and the drive motor 67 used to rotate the rod 90 with one hand while grasping the drive motor 67 with the other hand to rotate shaft 99 relative hand portion 102 to rotate the shaft 90 to raise and lower the blind or shade 11.

Moreover the various embodiments of the wand 90 can be used on window covers mounted outside of a building. In other words the invention described herein is applicable both inside and outside of a building having an opening. For example there are opening covers (comprised of vinyl, metal, such as aluminum or the like, and even wood) for outside the windows or even doors and the like that are used in Europe.

What is claimed is:

1. A control module for a window shade for a window opening comprising;
    (a) a housing disposed at one end of said window shade and said window opening to define a gap there between;
    (b) a first and second cavity presented by said housing, said second cavity communicating with said first cavity;
    (c) a driven gear disposed within said first cavity, said driven gear rotatable about a first axis;
    (d) drive means located within said second cavity, said drive means rotatable about a second axis, and engageable with said driven gear to rotatably drive the driven gear so as to raise and lower said window shade relative the window opening;
    (e) a cover having:
        (i) a first plate to cover the driven gear in said first cavity, and
        (ii) a second plate to cover the drive means in said second cavity, said second plate spaced from said first plate; and
        (iii) a connecting member for connecting one end of said first plate to one end of said second plate;
    (f) a rod for driving said drive means.

2. A control module as claimed in claim 1 wherein said housing has an end wall adjacent an inside edge of the window opening, a clutch projecting from said housing; said clutch engageable with said window shade, said driven gear engageable with or connected to said clutch and disposed between said window shade and said end wall adjacent said edge of the window opening.

3. A control module as claimed in claim 2 wherein said housing includes a first housing portion defining said first cavity for receiving said driven gear and a second housing portion defining said second cavity portion for communicating with said first housing portion, said second housing receiving said drive gear means.

4. A control module as claimed in claim 1 wherein the first axis comprises a clutch axis; and the drive means comprises a drive gear means disposed in said second cavity adjacent said end wall and engageable with said driven gear means to rotatably drive said clutch and shade about said clutch axis for raising and lowering said shade relative said window opening.

5. A control module as claimed in claim 4 wherein said cover constrains said drive gear means and driven gear against binding.

6. A control module as claimed in claim 5 wherein said driven gear comprises a spur gear disposed at said one end of said clutch between said end wall and said one end of said shade.

7. A control module as claimed in claim 6 wherein the drive gear means is a worm gear.

8. A control module as claimed in claim 7 wherein said clutch includes selectively engageable braking means for preventing said shade from unrolling when said driven gear is idle.

9. A control module for a window shade for a window opening comprising;
(a) a housing disposed at one end of said window shade and said window opening to define a gap between said window shade and said window opening; said housing having an end wall adjacent an inside edge of the window opening,
(b) said housing comprising a first housing defining a first cavity, and a second housing defining a second cavity communicating with said first housing;
(c) a driven gear means disposed within said first cavity;
(d) drive means located within said second cavity adjacent said end wall and engageable with said driven gear for rotatably driving the driven gear so as to raise and lower said window shade relative the opening;
(e) a clutch projecting from said housing and engageable with said window shade, said driven gear engageable with or connected to said clutch for rotatably driving said clutch and said shade about a clutch axis for raising and lowering said shade relative said window opening;
(f) a rod for driving said drive means; and
wherein the thickness of said spur gear along said clutch axis is between 5 to 8 millimeters.

10. A narrow profile control module as claimed in claim 9 wherein said gap is between 5 and 8 millimeters.

11. A narrow profile control module for a window shade roll for a window opening comprising;
(a) a housing disposed at one end of said window shade roll, said housing associated with a control end wall and a first cavity portion and a second cavity portion, said first cavity portion communicating with said second cavity portion;
(b) a spur gear disposed in said first cavity portion between said control end wall and one end of said window shade roll, and defining a gap between said one end of said window shade and window opening;
(c) a clutch projecting from said spur gear into said window shade roll, said spur gear rotatably engageable with said clutch about a clutch axis for raising and lowering said window shade relative the window opening;
(d) drive gear means disposed in said second cavity portion, said drive gear means engageable with said spur gear for rotatably driving said clutch about said clutch axis for raising and lowering said window shade;
(e) a cover having:
(i) a first plate to cover the spur gear in said first cavity, and
(ii) a second plate to cover the drive gear means in the second cavity, said second plate spaced from said first plate; and
(iii) a connecting member for connecting one end of said first plate to one end of said second plate;
f a rod connected to said drive gear means rotatably drive said spur gear.

12. A narrow profile control module as claimed in claim 11 wherein said drive gear means includes a worm gear engageable with said spur gear.

13. A narrow profile control module as claimed in claim 11 wherein said one end of said shade contacts said first plate to define said gap between said first plate covering said driven gear in said first cavity and said end wall.

14. A narrow profile control module as claimed in claim 11 wherein said rod comprises a wand having one end connected to said drive gear means and a handle at another end for manually rotating said wand and spur gear.

15. A narrow profile control module as claimed in claim 14 wherein said clutch includes selectively engageable braking means for preventing said shade from unrolling when said spur gear is idle.

16. A narrow profile control module as claimed in claim 11 wherein:
(a) said rod extends along a longitudinal length thereof to present a longitudinal axis with opposite ends;
(b) one end presenting engagement means for engaging the control module for moving said window shade relative the window opening;
(c) motor means axially disposed at the other end of said rod for selectively rotating said rod about said axis in one direction and raising said window blind relative said window opening and rotating said rod about said axis in the opposite direction for lowering said window blind relative said window opening.

17. A narrow profile control module as claimed in claim 16 wherein said motor means comprises one of a male extension or female socket while said other end of said rod motor means comprises the other of said one of a male extension or female socket.

18. A narrow profile control module as claimed in claim 16 wherein said engagement means comprises a hook at said one end for engagement with one end of a worm gear presented by the control module.

19. A narrow profile control module as claimed in claim 16 wherein said engagement means comprises a pair of fingers defining a space between said fingers for engagement with said one end of a worm gear presented by the control module.

20. A narrow profile control module as claimed in claim 19 wherein said one end of said one end of said worm gear comprises an "O" shaped receiver for engagement with said pair of fingers.

21. A narrow profile control module as claimed in claim 3 wherein said "o" shaped receiver presents a restriction in cross section which is smaller than the space between said pair of spaced fingers so that said fingers snap into position with said 'O' shaped receiver.

* * * * *